(12) United States Patent
Niimi et al.

(10) Patent No.: US 7,400,592 B1
(45) Date of Patent: Jul. 15, 2008

(54) PICTURE DISTRIBUTION SYSTEM AND METHOD THEREOF

(75) Inventors: Hiroshi Niimi, Kanagawa (JP); Nobuyuki Kaneko, Kanagawa (JP); Takehiko Fujiyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 09/620,715

(22) Filed: Jul. 20, 2000

(30) Foreign Application Priority Data

Sep. 17, 1999 (JP) ................................. 11-264147

(51) Int. Cl.
*H04L 12/16* (2006.01)
*H04Q 11/00* (2006.01)
*H04B 7/212* (2006.01)
*H04J 3/16* (2006.01)
*H04J 3/22* (2006.01)

(52) U.S. Cl. .................. 370/270; 370/442; 370/468

(58) Field of Classification Search ................. 370/403, 370/404, 442, 443, 444, 458, 459, 460, 468, 370/477, 496, 503, 521, 465, 258
See application file for complete search history.

(56) References Cited

U.S. PATENT DOCUMENTS

| | | | | | |
|---|---|---|---|---|---|
| 4,665,518 A | * | 5/1987 | Champlin et al. | ........... | 370/222 |
| 5,742,594 A | * | 4/1998 | Natarajan | ................... | 370/336 |
| 5,857,147 A | * | 1/1999 | Gardner et al. | ........... | 455/67.11 |
| 6,014,694 A | * | 1/2000 | Aharoni et al. | ............. | 709/219 |
| 6,396,816 B1 | * | 5/2002 | Astle et al. | .................. | 370/264 |
| 6,611,537 B1 | * | 8/2003 | Edens et al. | ................ | 370/503 |

FOREIGN PATENT DOCUMENTS

| | | |
|---|---|---|
| JP | 6-153166 | 5/1994 |
| JP | 6-303587 | 10/1994 |
| JP | 7-248980 | 9/1995 |

* cited by examiner

*Primary Examiner*—Daniel J. Ryman
(74) *Attorney, Agent, or Firm*—Katten Muchin Rosenman LLP

(57) ABSTRACT

A plurality of distribution devices accommodate one or more respective cameras. Respective picture monitors are connected to a plurality of receiving devices. The plurality of distribution devices and the plurality of receiving devices are connected by a transmission line. This transmission line is in a ring shape, and transmits picture data by a time division multiplex method. On receipt of a request related to picture display from a user terminal, a central device transmits an instruction to the plurality of distribution devices and to the plurality of receiving devices, according to a usage condition of the transmission line and the number of simultaneously distributed pictures. The plurality of distribution devices distribute picture data according to the instruction, and the plurality of receiving devices receive the picture data according to the instruction.

13 Claims, 27 Drawing Sheets

| TIME SLOT NO. | HOW TO STORE PICTURE DATA | DISTRIBUTION DEVICE NO. | CAMERA NO. |
|---|---|---|---|
| # 1 | WHOLE 6M BITS | 1 | 101 a |
| # 2 | WHOLE 6M BITS | 1 | 101 b |
| # 3 | FORMER HALF 3M BITS OF 6M BITS | 1 | 101 c |
| # 3 | LATTER HALF 3M BITS OF 6M BITS | 2 | 101 d |
|  |  |  |  |

F I G. 1 1

| RECEIVING DEVICE NO. | DISTRIBUTION DEVICE NO. | CAMERA NO. |
|---|---|---|
| 5a | 1 | 101a |
| 5b | 1 | 101b |
| 5c | 1 | 101c |
| 5d | 2 | 101d |
| 5e | NOT RECEIVED | NOT RECEIVED |
| 5f | NOT RECEIVED | NOT RECEIVED |
| 5g | NOT RECEIVED | NOT RECEIVED |
| 5h | NOT RECEIVED | NOT RECEIVED |
| | | |

FIG. 12

| RECEIVING DEVICE NO. | PRIORITY |
|---|---|
| 5 a | HIGH |
| 5 b | HIGH |
| 5 c | LOW |
| 5 d | HIGH |
| 5 e | LOW |
| 5 f | LOW |
| 5 g | LOW |
| 5 h | LOW |
| | |

FIG. 13A

| CAMERA | PRIORITY |
|---|---|
| 101 a | HIGH |
| 101 b | HIGH |
| 101 c | LOW |
| 101 d | LOW |
| ⋮ | |

FIG. 13B

| TIME SLOT NO. | HOW TO STORE PICTURE DATA | DISTRIBUTION DEVICE NO. | CAMERA NO. |
|---|---|---|---|
| #1 | WHOLE 6M BITS | 1 | 101a |
| #2 | WHOLE 6M BITS | 1 | 101b |
| #3 | | | |

FIG. 15A

| TIME SLOT NO. | HOW TO STORE PICTURE DATA | DISTRIBUTION DEVICE NO. | CAMERA NO. |
|---|---|---|---|
| #1 | WHOLE 6M BITS | 1 | 101a |
| #2 | WHOLE 6M BITS | 1 | 101b |
| #3 | WHOLE 6M BITS | 1 | 101c |

FIG. 15B

| TIME SLOT NO. | HOW TO STORE PICTURE DATA | DISTRIBUTION DEVICE NO. | CAMERA NO. |
|---|---|---|---|
| #1 | WHOLE 6M BITS | 1 | 101a |
| #2 | WHOLE 6M BITS | 1 | 101b |
| #3 | FORMER HALF 3M BITS | 1 | 101c |
| #3 | LATER HALF 3M BITS | 2 | 101b |

| RECEIVING DEVICE NO. | DISTRIBUTION DEVICE NO. | CAMERA NO. |
|---|---|---|
| 5 a | 1 | 1 0 1 a |
| 5 b | 1 | 1 0 1 b |
| 5 c | — | — |
| 5 d | — | — |

FIG. 16B

| RECEIVING DEVICE NO. | DISTRIBUTION DEVICE NO. | CAMERA NO. |
|---|---|---|
| 5 a | 1 | 1 0 1 a |
| 5 b | 1 | 1 0 1 b |
| 5 c | 1 | 1 0 1 a |
| 5 d | — | — |

FIG. 16C

| RECEIVING DEVICE NO. | DISTRIBUTION DEVICE NO. | CAMERA NO. |
|---|---|---|
| 5 a | 1 | 1 0 1 a |
| 5 b | 1 | 1 0 1 b |
| 5 c | 1 | 1 0 1 c |
| 5 d | — | — |

FIG. 16D

| RECEIVING DEVICE NO. | DISTRIBUTION DEVICE NO. | CAMERA NO. |
|---|---|---|
| 5 a | 1 | 1 0 1 a |
| 5 b | 1 | 1 0 1 b |
| 5 c | 1 | 1 0 1 c |
| 5 d | 2 | 1 0 1 d |

PICTURE DISTRIBUTION SYSTEM AND METHOD THEREOF

CROSS REFERENCE

The subject matter of this application is related to that disclosed in U.S. application Ser. No. 09/450,616. That U.S. application Ser. No. 09/450,616 is incorporated herein by reference.

BACKGROUND OF THE INVENTION

1. Field of the Invention

The present invention relates to a system for distributing picture data and in particular relates to a system for distributing a plurality of picture data from a picture distribution device to a plurality of picture receiving devices by a time division multiplex method using a ring-shaped transmission line.

2. Description of the Related Art

A system for displaying pictures taken by a plurality of cameras at a plurality of terminals is widely used in a variety of fields. For example, a system in which monitor cameras are installed at a plurality of locations, the picture from each monitor camera is transmitted to a central station via a network, the situation of each location is monitored by displaying pictures transmitted from the plurality of locations on a plurality of monitors installed in the central station is widely known. As specific examples, a road traffic monitoring system, disaster situation monitoring system, etc., are widely known. In the road traffic monitoring system, a traffic condition is monitored using pictures transmitted from each monitor point, and traffic guidance information is provided based on the pictures. In the disaster situation monitoring system, monitoring cameras are installed in a river which is in danger of flooding, etc., and an alarm is issued based on pictures transmitted from the cameras.

FIG. 1 shows the configuration of an example of an existing picture distribution system. This system comprises a plurality of cameras 101a-101c, a distribution device 102 for transmitting picture data outputted from each of the cameras 101a-101c to a network, a plurality of receiving devices 103a-103c for receiving the picture data from the network and a plurality of picture monitors 104a-104c for displaying the picture data received by corresponding receiving device. In this case, the network is a ring-shaped transmission line 105. A plurality of logical channels #a-#c are established in the transmission line 105.

Each of the receiving devices 103a-103c receives picture data from a respective predetermined logical channel. In the example shown in FIG. 1, the receiving devices 103a-103c receive picture data from the logical channels #a-#c, respectively.

The distribution device 102 transmits picture data outputted from each of the cameras 101a-101c to a corresponding logical channel. In the example shown in FIG. 1, a distribution request "to display picture data taken by a camera 101a on a picture monitor 104b and to display picture data taken by a camera 101b on picture monitors 104a and 104c" is issued to the distribution device 102. Therefore, the distribution device 102 transmits the picture data taken by the camera 101a to a logical channel #b and transmits the picture data taken by camera 101b to logical channels #a and #c. A distribution request is, for example, issued from the central station, which is not shown in FIG. 1.

According to the system described above, pictures taken by a plurality of specific cameras can be displayed on a plurality of respective supervisory monitors.

In the system described above, the transmission method of picture data is not limited to the method described above. However, in a system for monitoring the traffic condition of a road, the situation of a river, etc., it is anticipated that a picture taken by each camera is displayed for a fairly long time. In this case, the amount of picture data transmitted from each camera to a supervisory monitor does not vary greatly as time elapses. Therefore, such a system often adopts time division multiplexing as a transmission method of picture data.

In a time division multiplex method, picture data are usually stored in a fixed-length frame composed of a plurality of time slots and transmitted. In this case, as shown in FIG. 2, each logical channel usually corresponds to one or a plurality of time slots. In an example shown in FIG. 2, time slots #1-#3 for logical channels #a-#c are provided for each frame. In this case, for example, data to be stored in the time slot #1 are transmitted via the logical channel #a. The length of each time slot is fixed in advance.

If a frame as shown in FIG. 2 is used, the distribution device 102 stores picture data taken by the camera 101a in the time slot #2 and stores picture data taken by the camera 101b in the time slots #1 and #3. Each of the receiving devices 103a-103c extracts picture data from the time slots #1-#3, respectively. In this way, pictures taken by camera 101a are displayed on the picture monitor 104b, and pictures taken by camera 101b are displayed on the picture monitors 104a and 104c.

In the system described above, each receiving device is connected to a predetermined logical channel. In the example shown in FIG. 1, the logical channels #a-#c are fixedly connected to the receiving devices 103a-103c, respectively. Specifically, the receiving devices 103a-103c can receive only picture data transmitted via the logical channels #a-#c, respectively.

Therefore, in order to display the same picture on a plurality of picture monitors, the same picture data must be transmitted via the number of logical channels equal to the number of the picture monitors. In this case, a plurality of logical channels are used by a plurality of picture data that is the same. In the example shown in FIG. 1, the two logical channels #a and #c are occupied by picture data outputted from the camera 101b. As a result, the efficiency of use of communications resources (the band of a transmission line 105) is degraded.

If the display of a picture monitor is switched, sometimes the display of another picture monitor may also be simultaneously switched.

Furthermore, in a configuration such that logical channels are connected to receiving devices on a one to one basis, the number of picture monitors which can be connected to this system is restricted by the number of logical channels established on the transmission line 105.

As described above, if the existing picture distribution system adopts time division multiplexing, the efficiency of use of communications resources is low and the number of picture monitors used to display pictures is restricted.

SUMMARY OF THE INVENTION

An object of the present invention is to provide a picture distribution system for displaying more pictures with the high efficiency of use of communication resources.

The picture distribution system of the present invention has a configuration such that picture data are distributed from a distribution device to a plurality of receiving devices, and comprises a network in which a plurality of logical channels are established by a time division multiplexing method, a distribution device for distributing picture data via a logical channel designated by a distribution instruction, and a plurality of receiving devices for receiving picture data from respective logical channels designated by a receiving instructions.

Each of the plurality of receiving devices can receive picture data from designated logical channel. If the same instruction is issued to a plurality of receiving devices, the plurality of receiving devices receive picture data from the same logical channel. Therefore, even if the same picture is displayed on a plurality of picture monitors, it is sufficient to transmit picture data via one logical channel. As a result, a waste of communications resources (band) can be avoided.

The picture distribution system of the present invention can also further comprise a determination unit determining the number of logical channels to be established in the network depending on the number of picture data to be transmitted, an allocation unit allocating respective bands in order to transmit picture data to the plurality of logical channels, and a generation unit generating a distribution instruction based on the determination unit and the allocation unit and transmitting the distribution instruction to the distribution device.

In the configuration described above, if there is a small number of picture data to be distributed simultaneously, a broad band can be allocated to each set of picture data, and as a result, a high-resolution picture can be displayed. On the other hand, if there is a large number of picture data to be distributed simultaneously, by allocating a narrow band to a specific set of picture data, if possible, the remaining band can be allocated to another set of picture data. In this way, according to the picture distribution system of the present invention, communications resources can be efficiently used.

BRIEF DESCRIPTIONS OF THE DRAWINGS

FIG. 11 shows a distribution state table.

FIG. 12 shows a receiving state table.

FIGS. 13A and 13B show a priority table.

FIGS. 15 A through 15 C show cases where a distribution state table is updated.

FIGS. 16A through 16D show cases where a receiving state table is updated.

Figure 17:
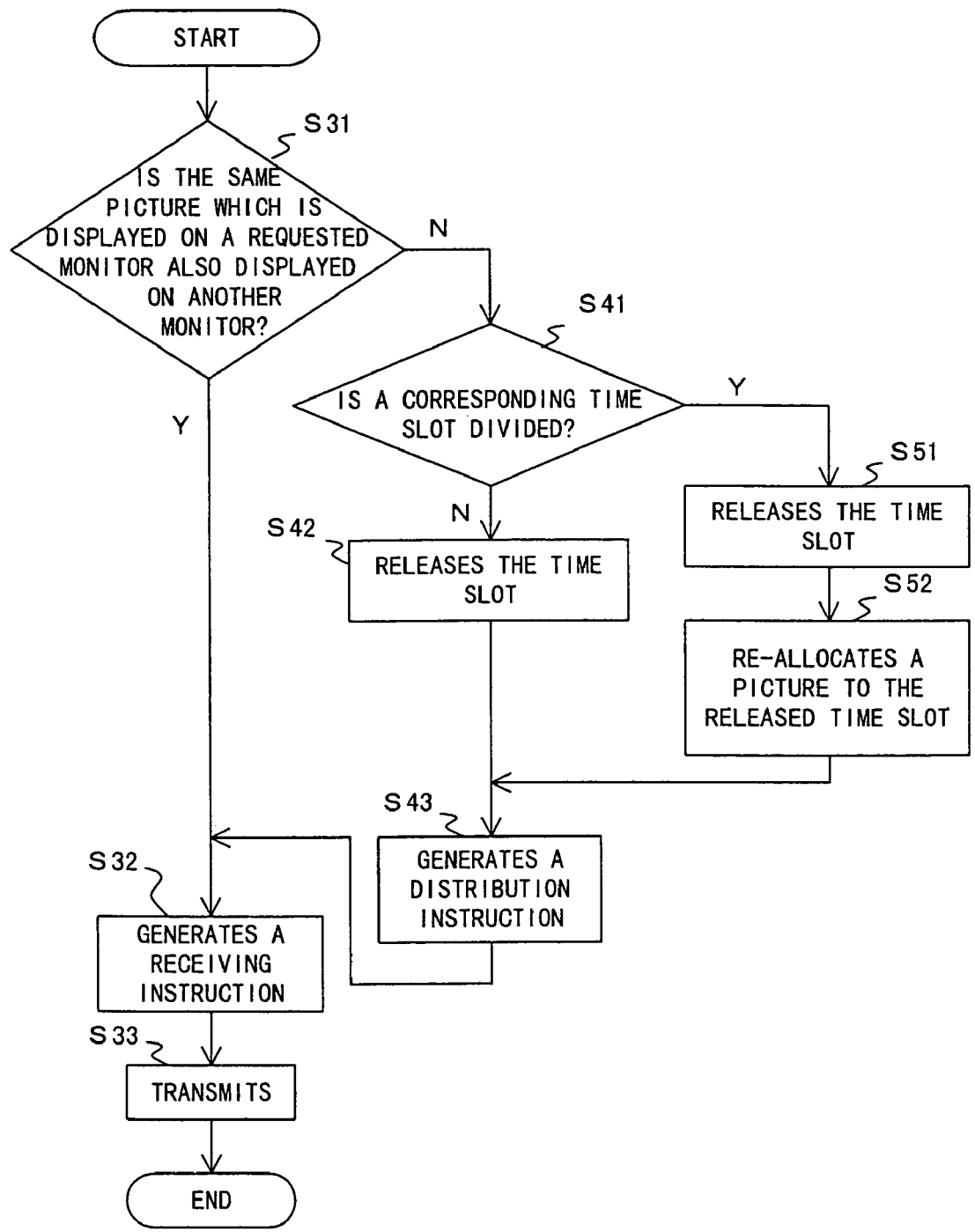

FIG. 17 is a flowchart showing the operation of a central device (No. 2).

Figure 18:
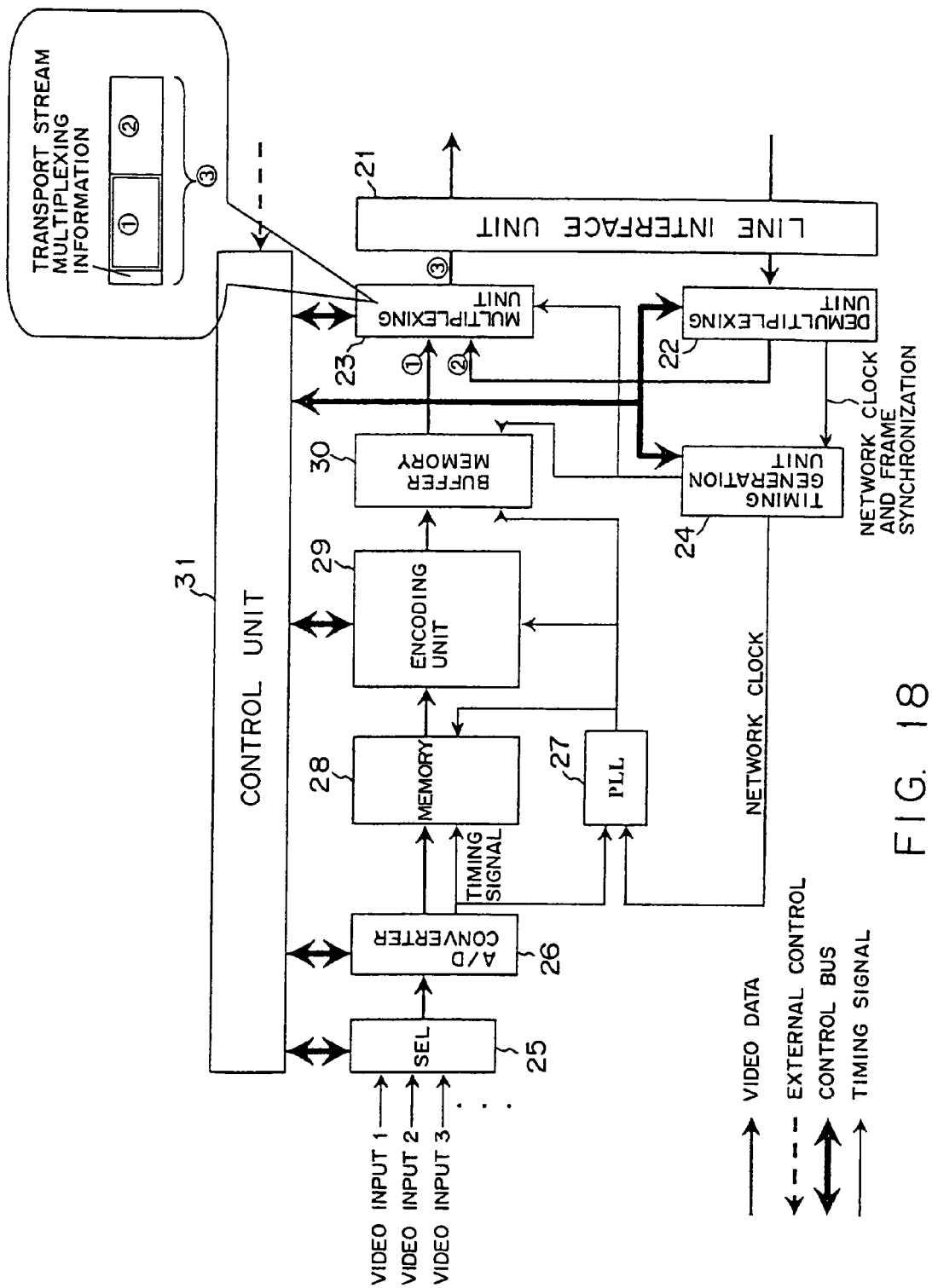

FIG. 18 shows a block diagram of a distribution device.

Figure 19:
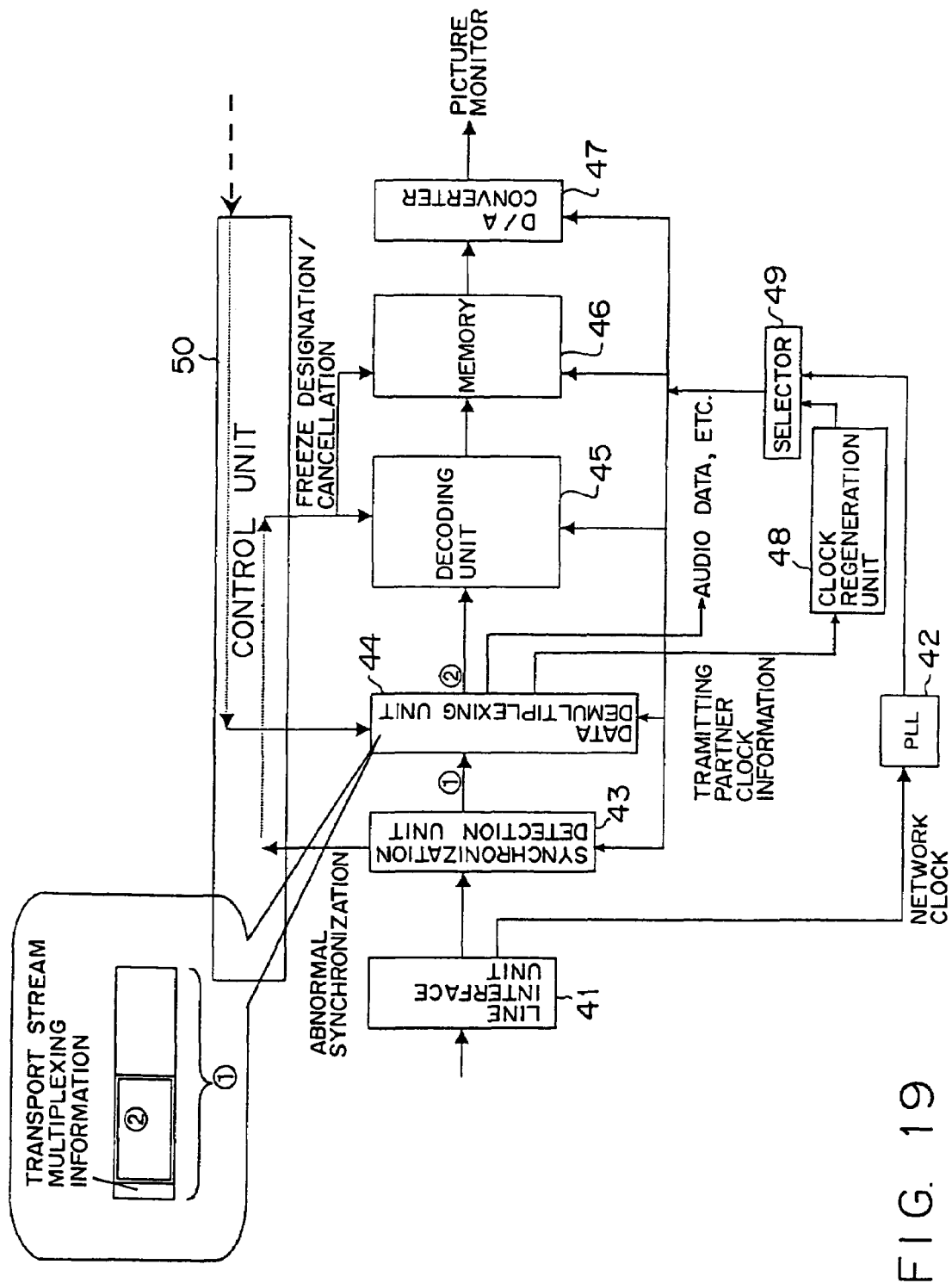
Figure 20:
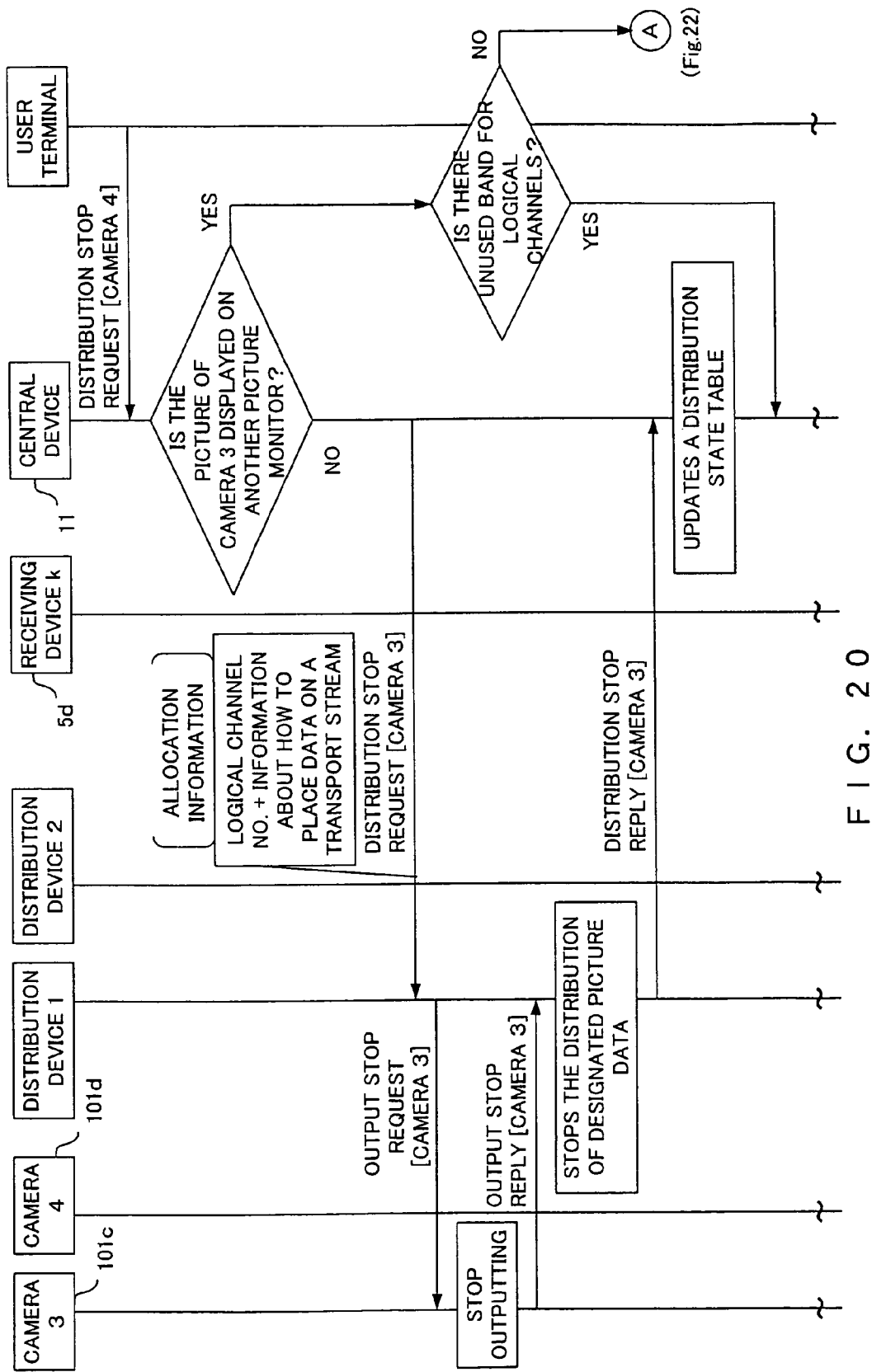

FIG. 19 shows a block diagram of a receiving device.

FIGS. 20 through 23 show the operation sequence of the picture distribution system.

Figure 24:
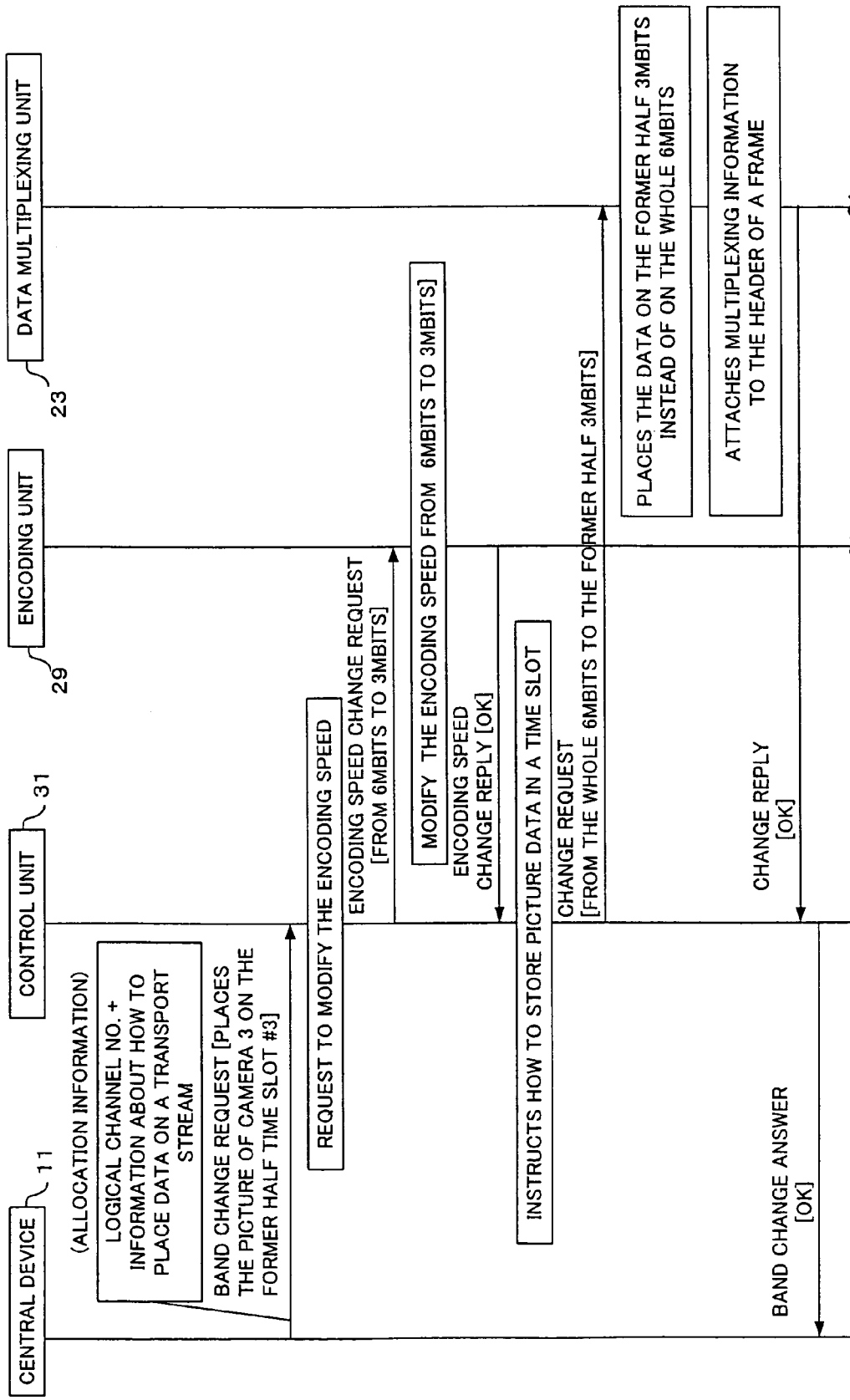

FIG. 24 is a sequence chart showing the operation of a distribution device in a case where the distribution device receives a band change request.

Figure 25:
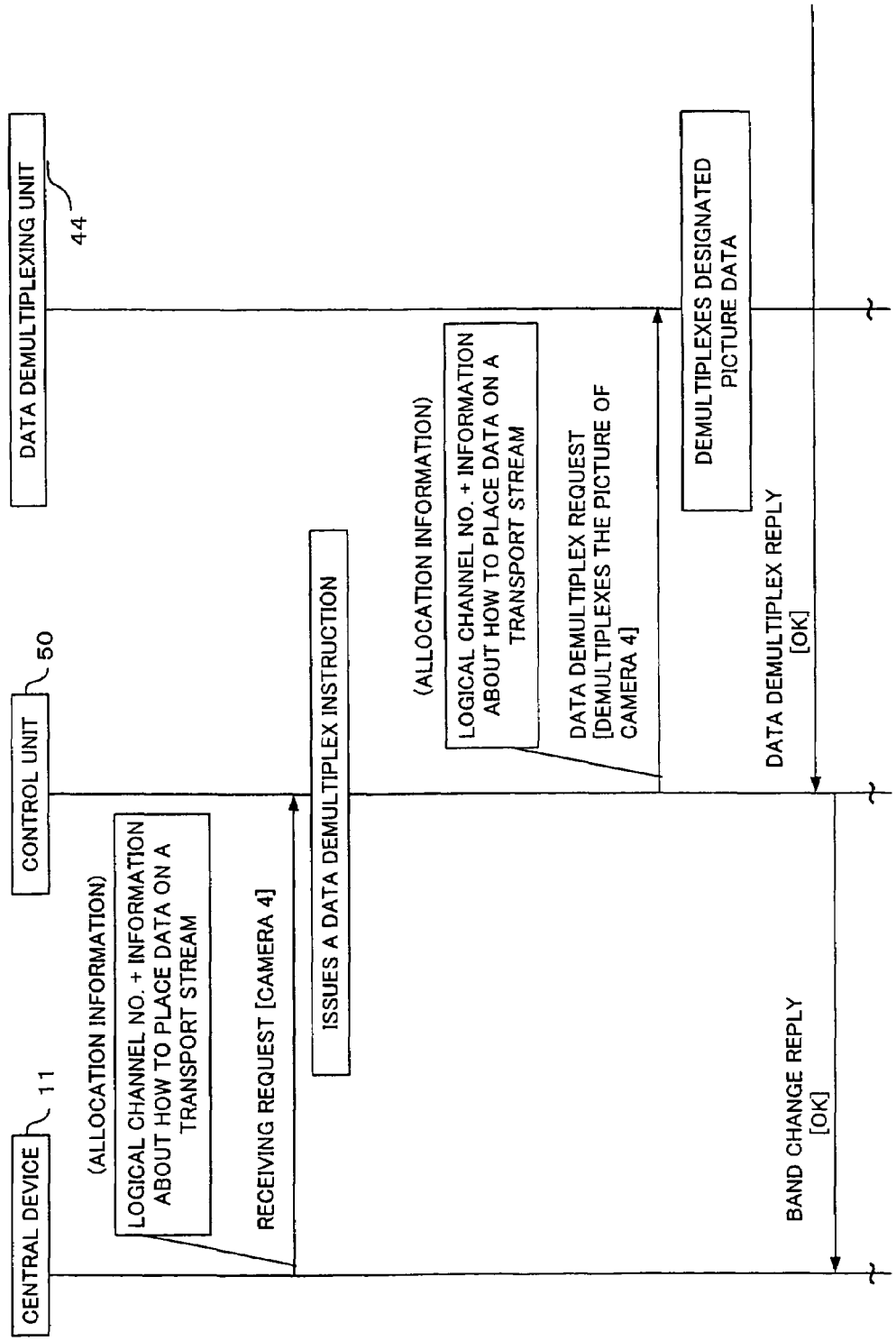

FIG. 25 is a sequence chart showing the operation of the receiving device.

Figure 26:
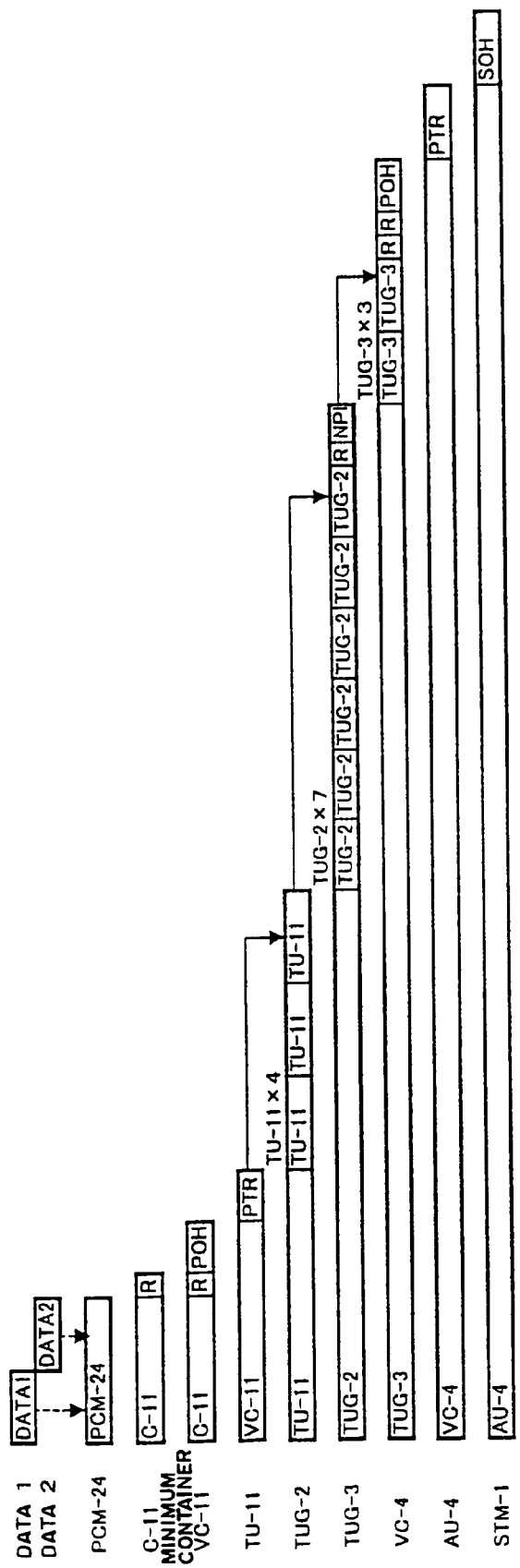
Figure 27:
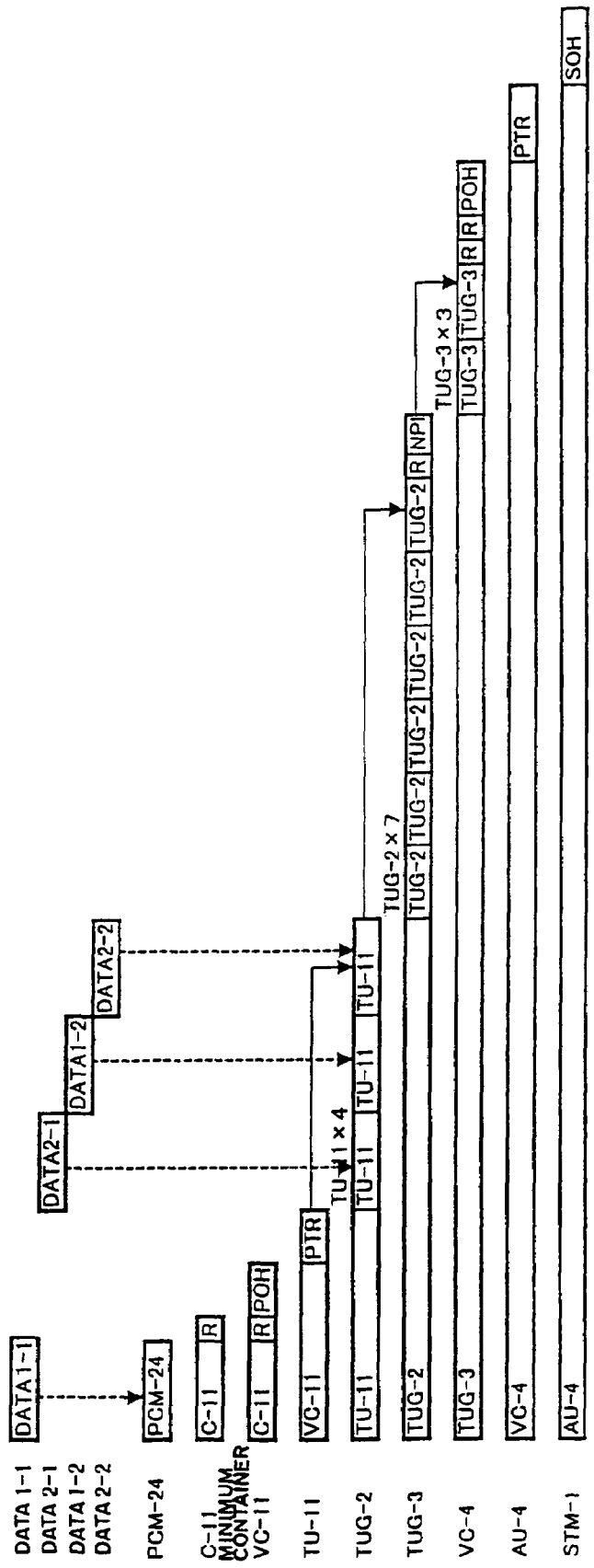

FIGS. 26 and 27 show examples of how to store picture data in an SDH frame.

DESCRIPTION OF THE PREFERRED EMBODIMENTS

The preferred embodiments of the present invention are described below with reference to the drawings.

Figure 1:
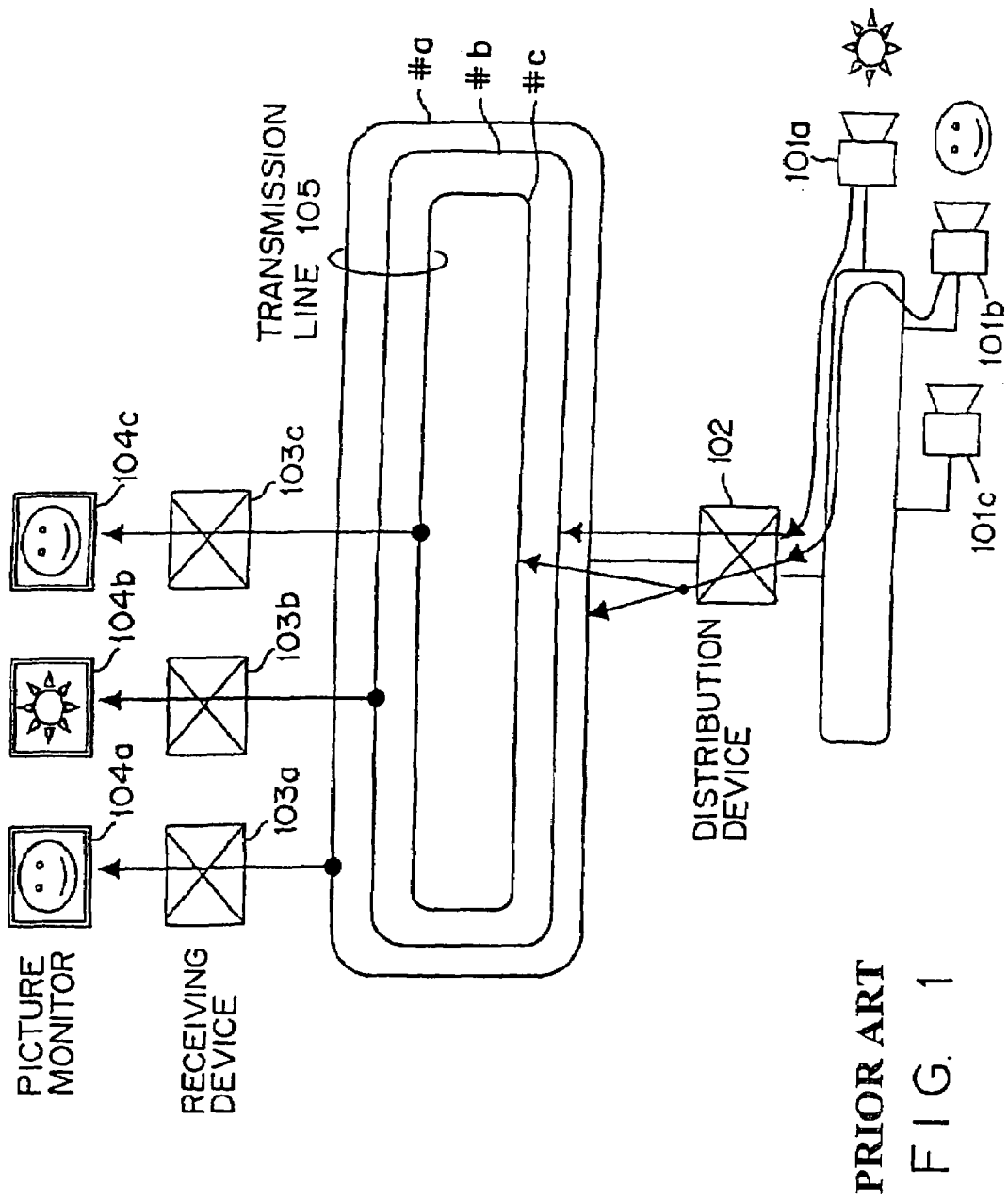
FIG. 1 shows the configuration of an example of the existing picture distribution system.
Figure 2:
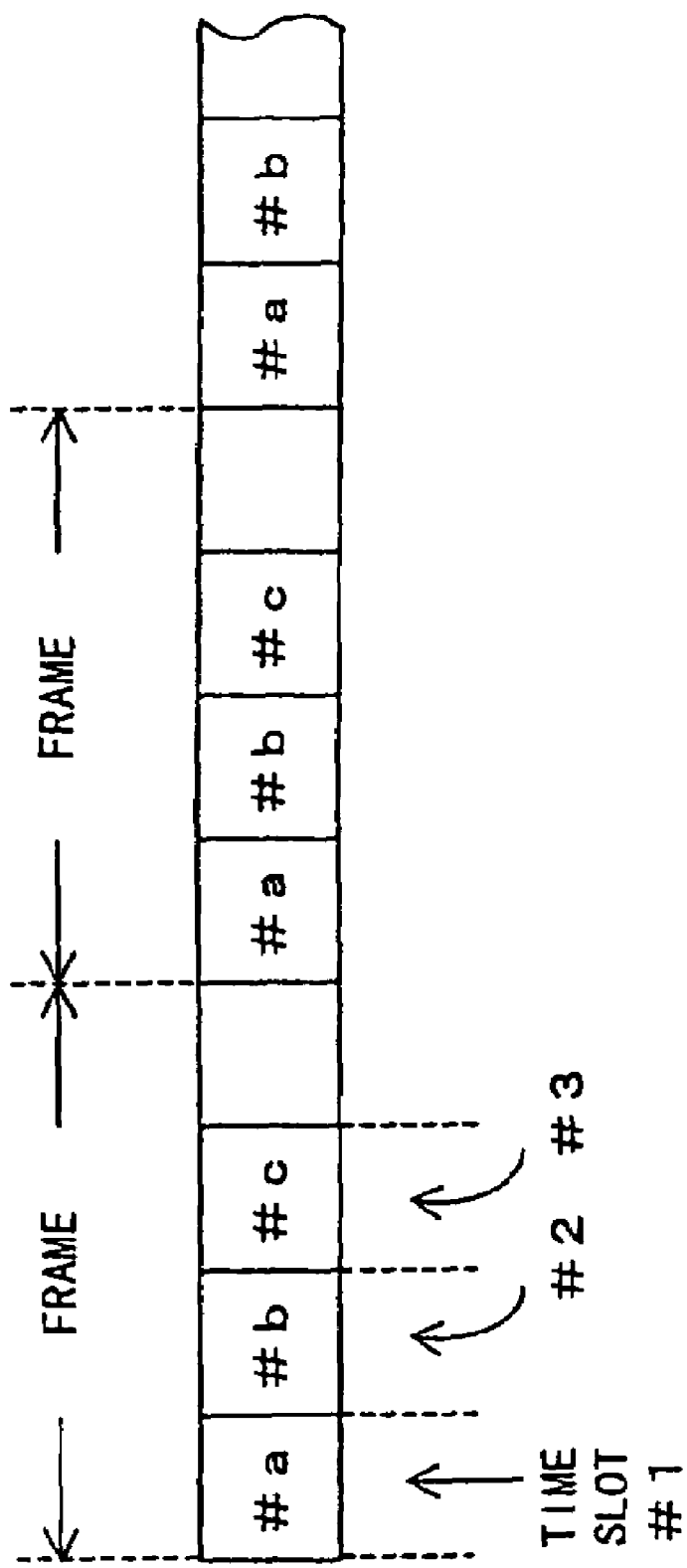
FIG. 2 shows a frame for storing picture data.
Figure 3:
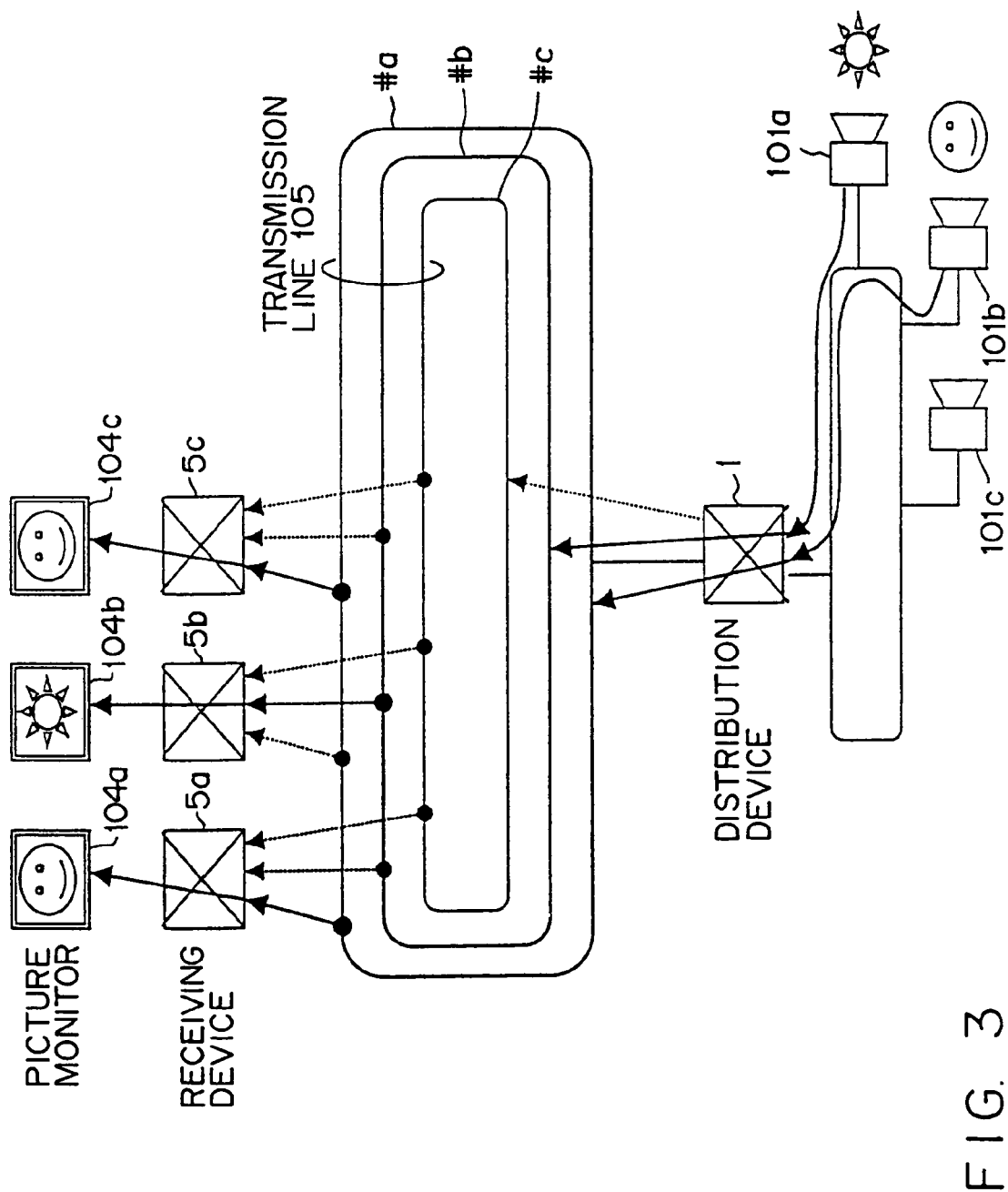
FIG. 3 shows the configuration of a picture distribution system in one preferred embodiment of the present invention.

FIG. 3 shows the configuration of a picture distribution system in one preferred embodiment of the present invention. The reference numerals and symbols used both in FIG. 1 and FIG. 3 represent the same devices. Specifically, the existing cameras 101a-101c, picture monitors 104a-104c and transmission line 105 can be used without modification. Picture data are transmitted from a distribution device 1 to receiving devices 5a-5b via a transmission line 105 by a time division multiplex method. In the following description, it is assumed that an SDH multiplex method is adopted in data transmission via the transmission line 105. An SDH (Synchronous Digital Hierarchy) is a digital communications standard recommended by ITU-T.

The distribution device 1 transmits each piece of picture data to a corresponding logical channel. In an example shown in FIG. 3, the distribution device 1 transmits picture data outputted from the camera 101a to the logical channel #b and transmits picture data outputted from the camera 101b to the logical channel #a. The distribution device 1 never transmits a specific set of picture data to a plurality of logical channels.

The receiving devices 5a-5c can extract picture data from one arbitrary logical channel among a plurality of logical channels established in the transmission line 105. In the example shown in FIG. 3, the receiving devices 5a, 5b and 5c extract picture data from the logical channels #a, #b and #c, respectively. The picture data received by the receiving devices 5a-5c are supplied to the picture monitors 104a-104c, respectively. In this way, pictures taken by the camera 102a are displayed on the picture monitor 104b, and pictures taken by the camera 101b are displayed on the picture monitors 104a and 104c. In this case, the logical channel #c is not used.

As described above, according to the picture distribution system of this preferred embodiment, a specific piece of picture data is never simultaneously transmitted via a plurality of logical channels. Specifically, according to the conventional system shown in FIG. 1, two logical channels (#a and #c) are occupied in order to display a picture taken by the camera 101b on two picture monitors (104a and 104c). However, according to the system of this preferred embodiment, the picture taken by the camera 101b can be displayed on the two picture monitors (104a and 104c) by transmitting the picture data via one logical channel. Therefore, according to the system of this preferred embodiment, the efficiency of use of communication resources (the band of the transmission line 105) is high. In addition, since each of the receiving devices 5a-5c can receive picture data from a desired logical channel, each receiving device can switch a logical channel to be connected without affecting the other receiving devices. Therefore, when the display of a specific picture monitor is switched, the displays of the other picture monitors are not affected by the switching.

Figure 4:
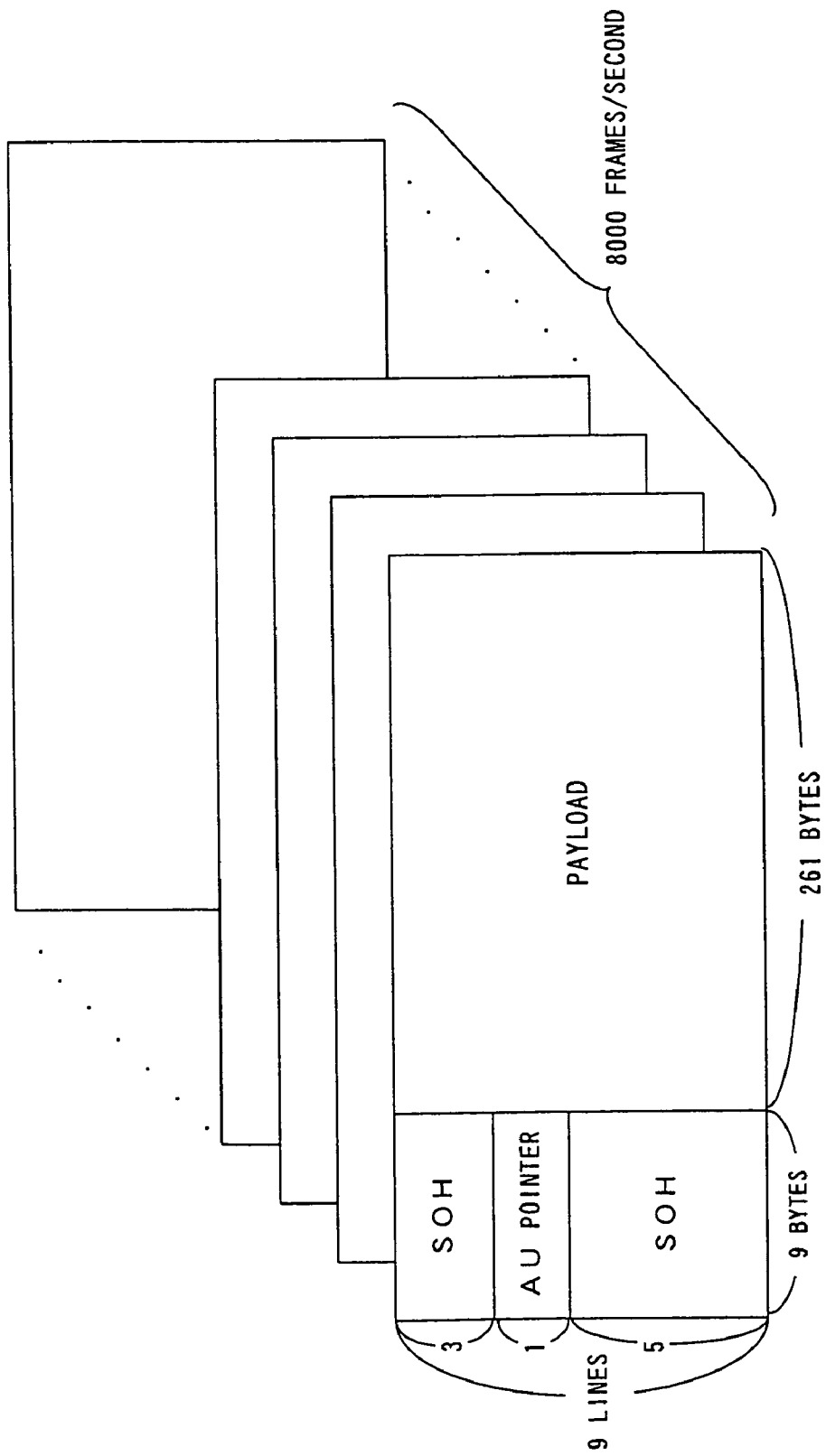
FIG. 4 shows a frame used in an SDH (Synchronous Digital Hierarchy).

FIG. 4 shows a frame used in an SDH. Picture data are stored in this frame and transmitted.

Each frame is composed of a header of 9 bites×9 lines and a payload of 261 bites×9 lines, which is not the correct size, if strictly speaking. The header includes an SOH and an AU pointer. The payload stores data to be transmitted. The speed of an SDH is, for example, 8,000 frames/second.

The picture data are stored in the payload of each frame, when transmitted from a distribution device to a receiving device. The position used to store picture data outputted from a camera is recognized by the distribution device.

Figure 5:
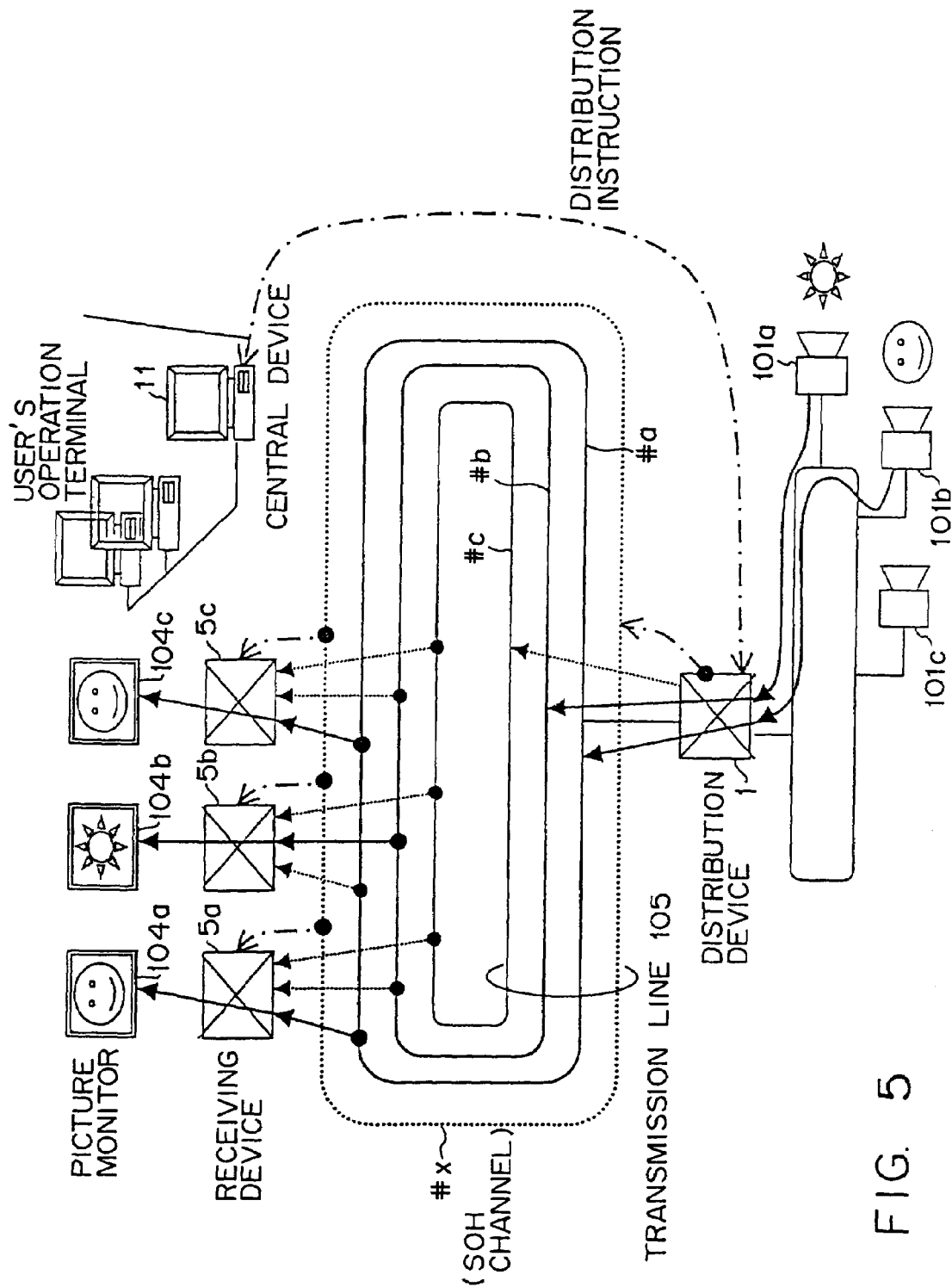
FIG. 5 shows how to control a distribution device and a receiving device.

FIG. 5 shows how to control a distribution device and a receiving device. A distribution device 1 is controlled by a distribution instruction issued by a central device 11. The central device 11 is installed, for example, in a central station which manages this entire system, and is connected to one or more user terminals (operation terminals) via a LAN. In this case, information for designating a picture to be displayed on the picture monitors 104a-104c is inputted, for example, using the user terminal. The central device 11 generates a distribution instruction based on the instruction inputted using the user terminal and transmits the instruction to the distribution device 1. If the central device 11 and distribution device 1 are connected by a dedicated line or LAN, the central device 11 transmits the distribution instruction to the distribution device 1 via the dedicated line or LAN. If a transmission line 105 is connected to the central device 11, the central device 11 can also transmit the distribution instruction to the distribution device 1 using an SOH, which is described later.

The receiving devices 5a-5c are controlled by a receiving instruction issued by the central device 11 or distribution device 1. If the central device 11 and each of the receiving devices 5a-5c are connected by a LAN, etc., the central device 11 transmits the receiving instruction to each of the receiving devices 5a-5c via the LAN, etc. A receiving instruction can also be transmitted from the distribution device 1 to each of the receiving devices 5a-5c via the transmission line 105. In this case, the distribution device 1 generates a receiving instruction based on the distribution instruction from the central device 11 and transmits the receiving instruction to each of the receiving devices 5a-5c using the SOH.

In the example shown in FIG. 5, a distribution instruction is transmitted from the central device 11 to the distribution device 1 via a dedicated line or LAN, and a receiving instruction is transmitted from the distribution device 1 to each of the receiving devices 5a-5c via the transmission line 105.

Figure 6:
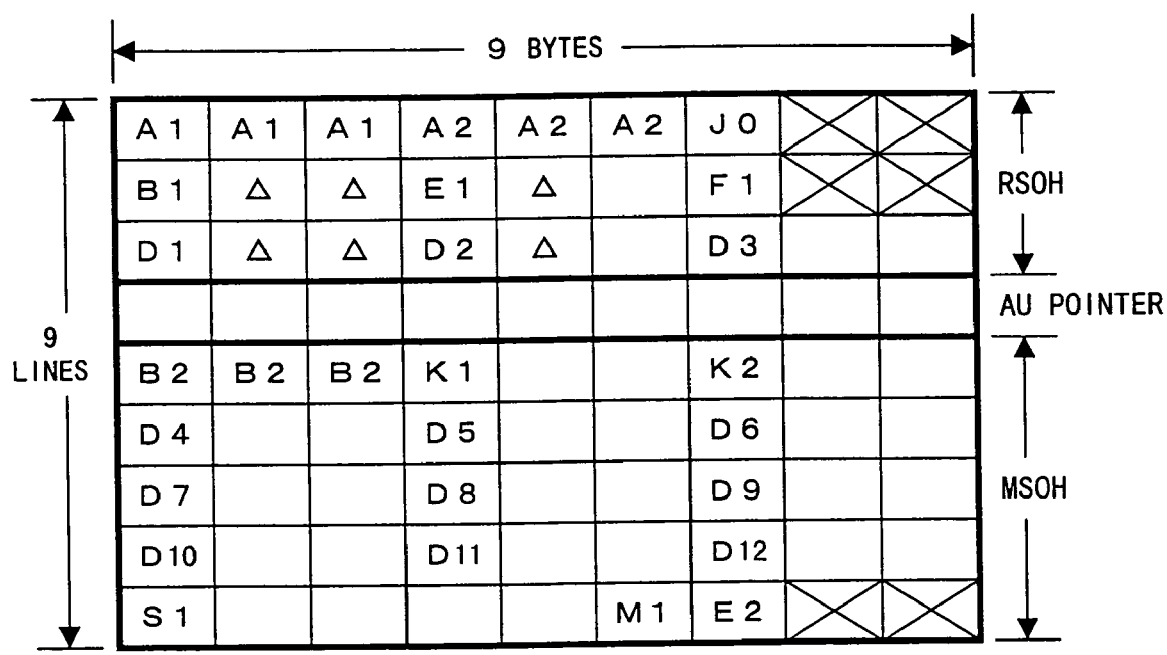
FIG. 6 shows an example of an SOH (section overhead).

FIG. 6 shows an example of an SOH. As shown in FIG. 4, an SOH is provided in the header of an SDH frame. An SOH is provided with a "user channel byte (F1)", which a user can freely use, in addition to areas that have predetermined usage, such as synchronization bytes (A1, A2) and parity bits (B1, B2). The data speed of transmission using this user channel byte is 64 kbps (=1 byte×8,000 frames/second).

If a distribution instruction or receiving instruction is transmitted via the transmission line 105, the instruction is stored in this user channel byte. In the example shown in FIG. 5, when generating a receiving instruction, the distribution device 1 stores the instruction in the user channel byte of each frame and transmits the frame via the transmission line 105. The receiving devices 5a-5c read the user channel byte of each frame transmitted via the transmission line 105.

Next, how picture data are transmitted via a transmission line 105 is described. As described above, the picture data are stored in the payload of the SDH frame shown in FIG. 4 and transmitted over the transmission line 105. Here, SDH frames are consecutively transmitted at specific intervals. Specifically, SDH frames are consecutively transmitted at the speed of 8,000 frames/second. The data string of this transmitted frame is often called a "transport stream".

A data area used to store picture data is fixedly assigned to a predetermined position of the payload. In this preferred embodiment, a data area used to store picture data is divided into three sub-areas. For example, if each of three pieces of picture data is stored in the corresponding sub-area of each frame and the frames are sequentially transmitted, it can be said that the three pieces of picture data are transmitted with time division multiplexing.

Figure 7A:
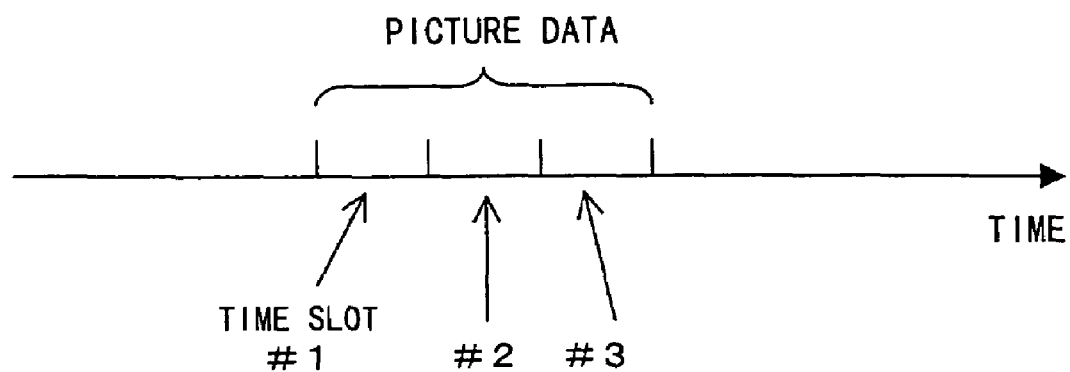
FIGS. 7A and 7B show a time slot storing picture data.
Figure 7B:
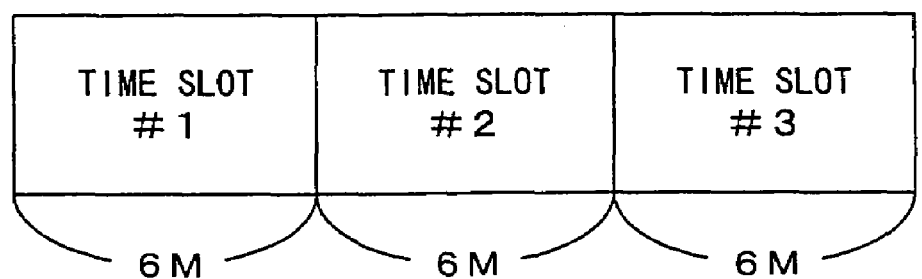

As shown in FIG. 7A, each of the sub-areas described above corresponds to each of the time slots #1-#3 used to transmit each piece of the picture data in terms of a time coordinate. In this case, if a band used to transmit picture data is assumed to be, for example, 18 MHz, each band allocated to each of the time slots #1-#3 is 6 MHz, as shown in FIG. 7B.

Figure 8:
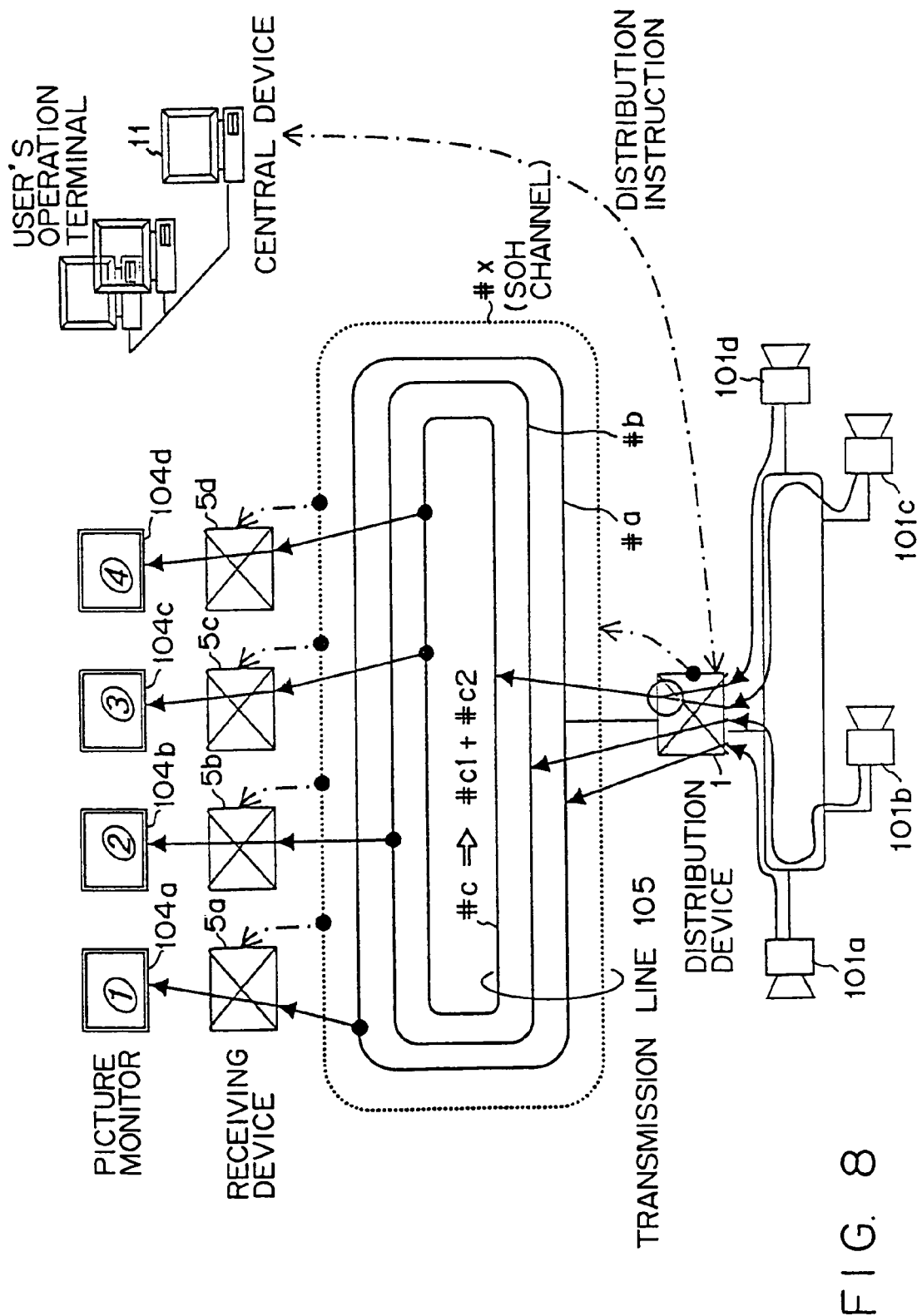
FIG. 8 shows how to control a band used to transmit picture data depending on a distribution state.

FIG. 8 shows how to control a band used to transmit picture data depending on a distribution state. Here, a case where respective pictures taken by cameras 101a-101c have been being displayed on picture monitors 104a-104c, respectively, and a picture taken by a camera 101d is newly displayed on a picture monitor 104d, will be explained.

Figure 9A:
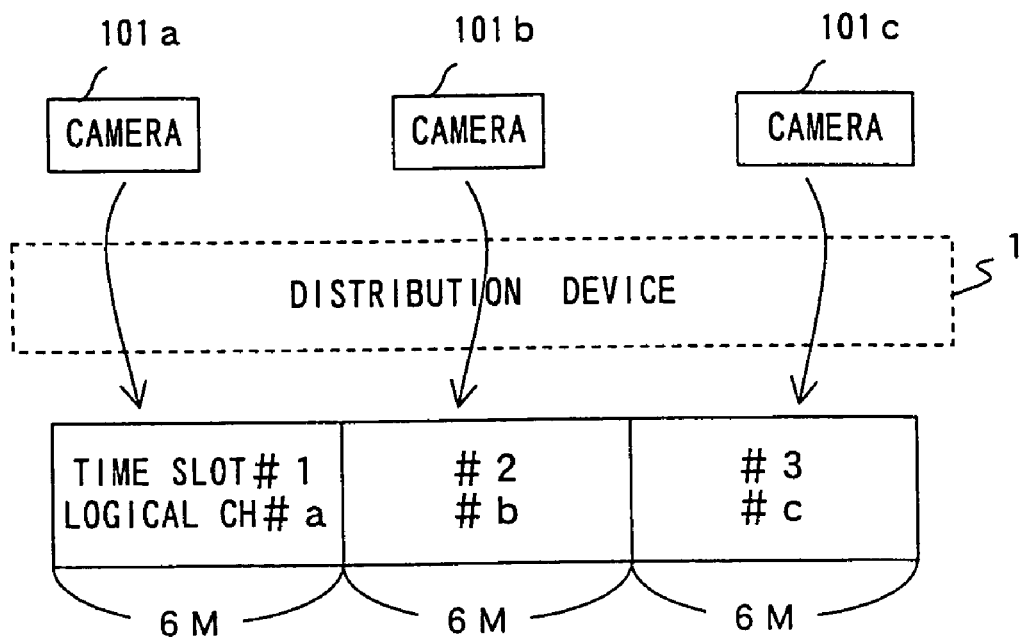
FIGS. 9A and 9B show how to store picture data in a time slot.

As shown in FIG. 9A, while respective pictures taken by the cameras 101a-101c are being displayed on the picture monitors 104a-104c, respectively, the distribution device 1 stores the respective pictures data outputted by the cameras 101a-101c in the time slots #1-#3, respectively, and transmits the data to the transmission line 105. Here, the respective paths used to transmit data using the time slots #1-#3 are defined as logical channels #a-#c, respectively. In this case, respective pieces of picture data outputted from the cameras 101a-101c are transmitted via the logical channels #a-#c, respectively. The receiving devices 5a-5c receive picture data from the logical channels #a-#c, respectively.

In such a situation, a user terminal transmits a request to "display a picture taken by a camera 101d on a picture monitor 104d" to the central device 11. On receipt of this request, the central device 11 first checks whether there is an unused time slot for transmitting picture data. If there is an unused time slot, the central device 11 notifies the distribution device 1 of the unused time slot. If all the time slots are already used, one of the time slots being used is selected and the distribution device 1 is notified of the selected time slot. Specifically, in both cases, information used to identify a time slot is, for example, information for indicating a position in the payload of a frame shown in FIG. 4. The central device 11 also notifies the distribution device 1 of both information for identifying the camera 101d and information for identifying the picture monitor 104d.

In the example shown in FIG. 8, all the time slots #1-#3 are being used. Therefore, the central device 11 selects the time slot #3 among the time slots #1-#3 and notifies the distribution device 1 of the fact as a distribution instruction. A method for selecting a time slot is described later.

Figure 9B:
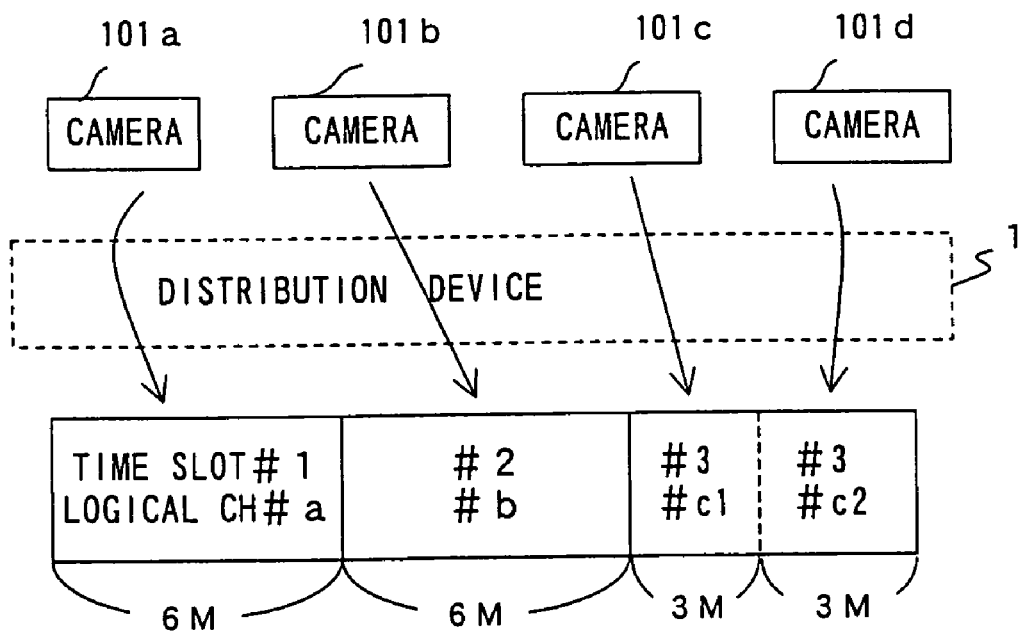

As shown in FIG. 9B, on receipt of this distribution instruction, the distribution device 1 divides the time slot #3 into two pieces and stores picture data outputted from the camera 101c and picture data outputted from the camera 101d in the former half and latter half, respectively. At this time, the distribution device 1 compresses picture data outputted from the cameras 101c and 101d into data at a rate of 3 Mbps, respectively. In this way, two logical channels #c1 and #c2 using the time slot #3 are established in the transmission line 105. The respective bands of the logical channels #c1 and #c2 are 3 Mbits, respectively. The distribution device 1 notifies the receiving devices 5a-5d of the modification of the time slot assignment (receiving instruction or multiplexing information). This receiving instruction is transmitted, for example, using an SOH.

Although the receiving device 5*c* obtains picture data from the whole time slot #3 before receiving the receiving instruction described above, it obtains picture data only from the former half of the time slot #3 after receiving the receiving instruction. On receipt of the receiving instruction, the receiving device 5*d* obtains picture data from the latter half of the time slot #3.

As described above, according to the picture distribution system of this preferred embodiment, if new picture data are transmitted in a situation where all bands are already used to transmit picture data, a new logical channel is established by adjusting a band to be allocated to each piece of picture data, and the new picture data are transmitted via the newly established logical channel. In other words, although the system adopts time division multiplexing, the number of channels used to transmit picture data can be increased without increasing the total band used to transmit picture data. As a result, the band of a transmission line can be efficiently used.

Figure 10:
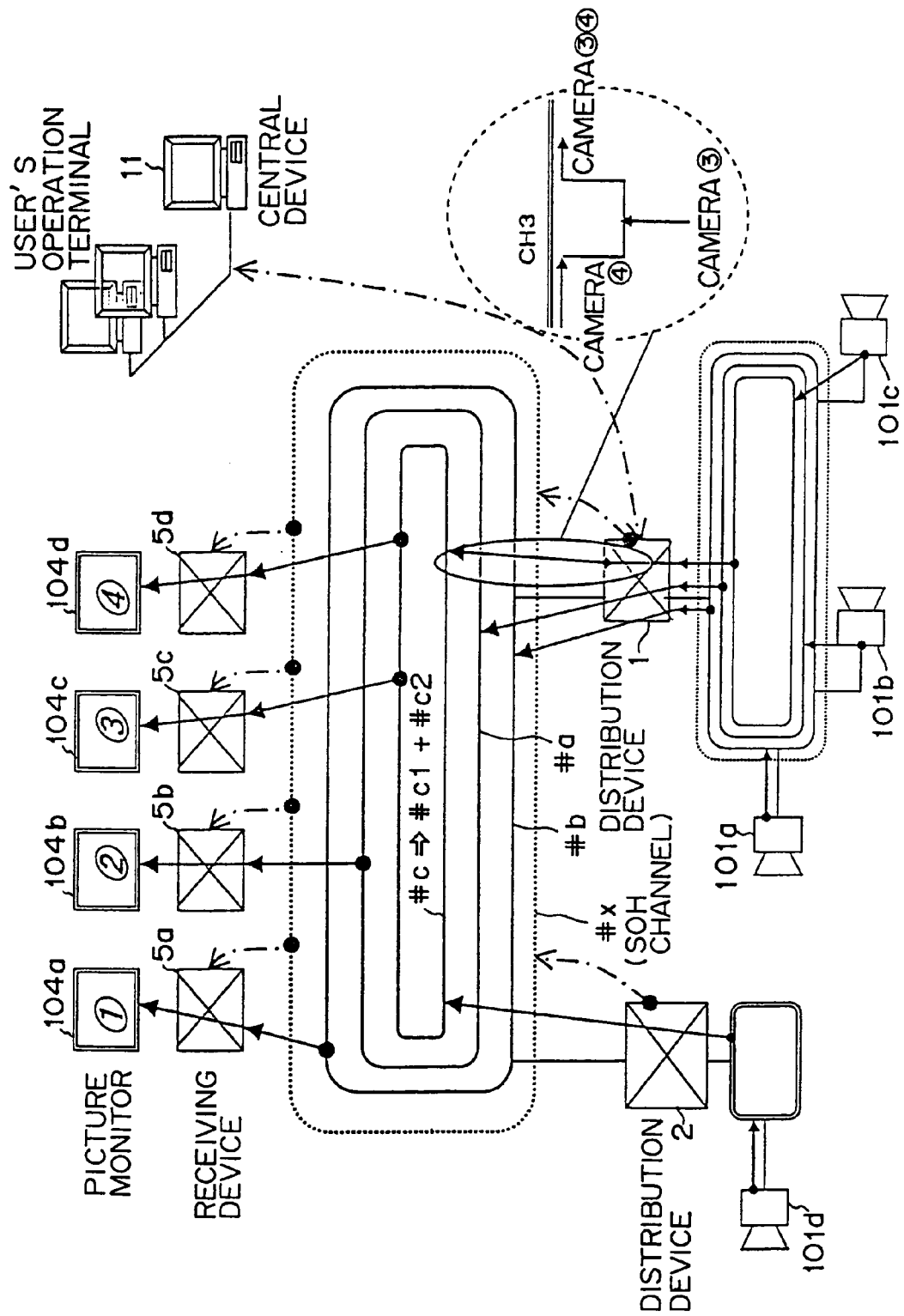
FIG. 10 shows the configuration of a picture distribution system accommodating a plurality of distribution devices.

Although in the preferred embodiment described above, picture data outputted from each camera are distributed to receiving devices by one distribution device, generally speaking, many picture distribution system are provided with a plurality of distribution devices. FIG. 10 shows an example of a picture distribution system with a plurality of distribution devices. In this example, a distribution device 1 accommodates cameras 101*a*-101*c* and a distribution device 2 accommodates a camera 101*d*.

In the system shown in FIG. 10, pictures taken by the cameras 101*a*-101*c* are assumed to be displayed on picture monitors 104*a*-104*c*, respectively. In this case, the distribution device 1 stores the picture data outputted from the cameras 101*a*-101*c* in time slots #1-#3, respectively, as shown in FIG. 9A.

In this situation, it is assumed that a request to "display a picture taken by a camera 101*d* on a monitor 104*d*" is inputted from a user terminal. In this case, the central device 11 checks whether there is an unused time slot, recognizes a distribution device which accommodates the camera 101*d*, and generates a distribution instruction based on those results. Then, the central device 11 notifies both the distribution devices 1 and 2 of the distribution instruction.

On receipt of this distribution instruction, the distribution device 1 stores picture data outputted by the cameras 101*a* and 101*b* in the time slots #1 and #2, respectively, and stores picture data outputted from the camera 101*c* in the former half of the time slot #3. In this case, the distribution device 1 stores, for example, dummy data in the latter half of the time slot #3. On receipt of the distribution instruction, the distribution device 2 stores picture data outputted from the camera 101*d* in the latter half of the time slot #3. In this way, the picture data outputted from the cameras 101*a*-101*d* are distributed to the receiving devices 5*a*-5*d*, respectively. A receiving instruction corresponding to that distribution instruction is issued in the same way as described with reference to FIG. 8.

As described above, if a plurality of distribution devices are connected to a transmission line 105, on receipt of a frame from the upstream side of the transmission line 105, each distribution device transmits the frame to the downstream side after storing picture data in a time slot assigned to the distribution device. In this way, picture data are distributed from a plurality of distribution devices to a plurality of receiving devices.

Next, a central device 11 is briefly described. A central device is a computer comprising a CPU (central processing unit), a memory, a storage device and an interface used to communicate with other terminals (including a user terminal, distribution terminal and receiving device) and it controls the operations of a distribution device and a receiving device according to the tables shown in FIGS. 11, 12, 13A and 13B.

FIG. 11 shows a distribution state table. The distribution state table manages the state of each distribution device installed in the picture distribution system. Specifically, the distribution state table defines the correspondence between each time slot used to transmit picture data and picture data to be stored in the time slot. A "time slot number" is information for identifying a time slot to store picture data. The number can also be indicated using a position in the payload of the frame shown in FIG. 4. "How to store picture data" indicates a size of picture data to be stored in each time slot and a position where the picture data are stored. In the example shown in FIG. 11, for example, picture data taken by the camera 101*c* are stored in the former half of the time slot #3 by the distribution device 1, and picture data taken by the camera 101*d* are stored in the latter half of the time slot #3 by the distribution device 2. A distribution device can generate information for instructing how to place picture data on a transport stream based on the content of this table. This information is sometimes transmitted to receiving devices as multiplexing information (transport stream multiplexing information).

FIG. 12 shows a receiving state table. The receiving state table manages the state of each receiving device. Specifically, the receiving state table defines the source of picture data which each receiving device receives (a transmitting device: in this preferred embodiment, both a distribution and a camera). The example shown in FIG. 12 shows that a receiving device 5*a* is receiving picture data which are outputted from a camera 101*a* and are transmitted by the distribution device 1.

FIGS. 13A and 13B show a priority table. The priority table shown in FIG. 13A defines the priority of each receiving device, and the priority table shown in FIG. 13B defines the priority for each camera.

On receipt of a request related to a picture display from a user terminal, the central device 11 refers to a variety of tables, as shown in FIGS. 11, 12, 13A and 13B, generates an instruction to be transmitted to the distribution device and also generates an instruction to be transmitted to the receiving device, if required. Then, the central device 11 transmits the generated instruction to the distribution device (and also to the receiving device, if required).

The following requests are considered to be transmitted from a user terminal to the central device 11.

(a) A request to display a picture on a specific picture monitor.

(b) A request to stop the picture display of a specific picture monitor.

(c) A request to switch a picture on a specific picture monitor to another picture.

Figure 14:
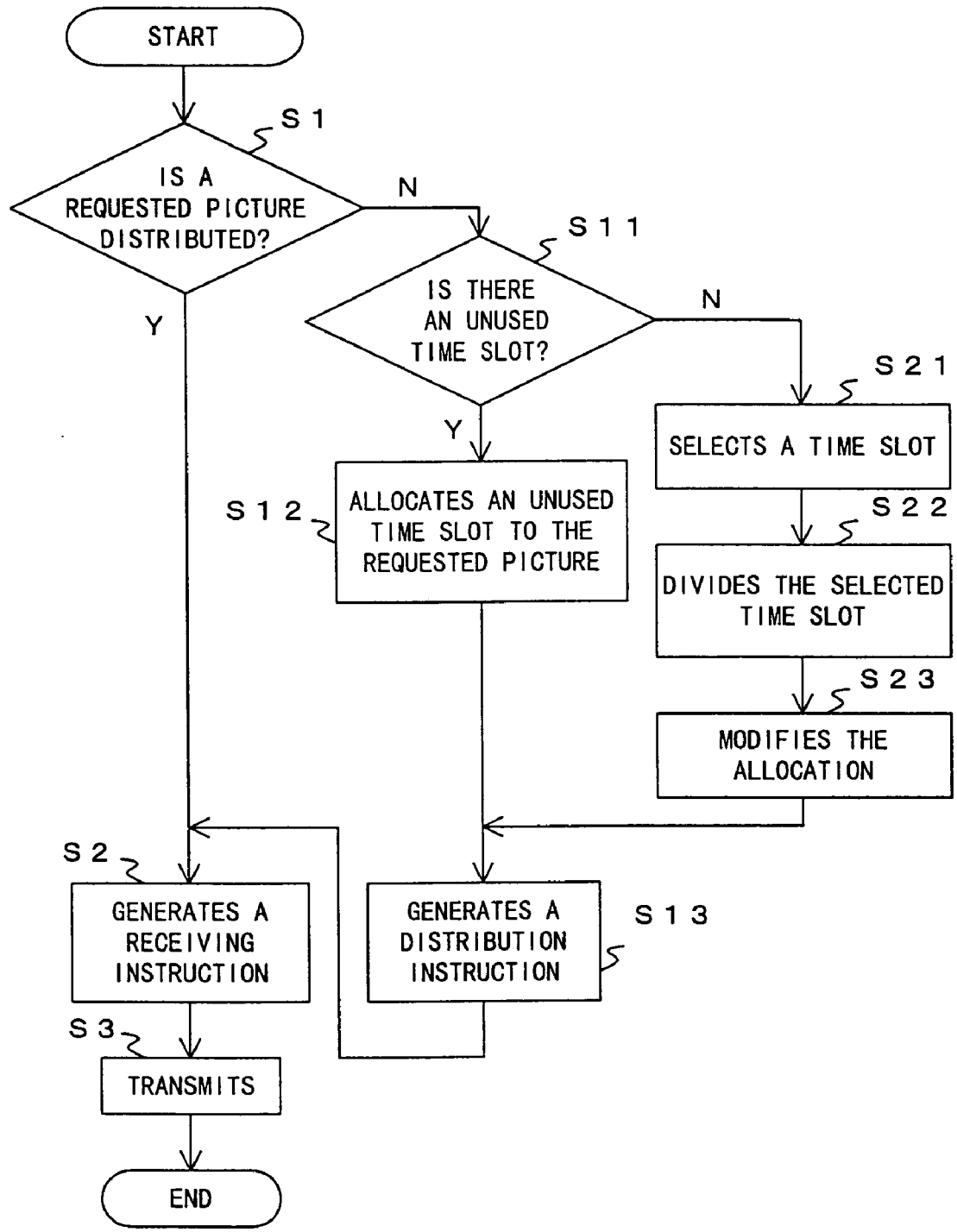
FIG. 14 is a flowchart showing the operation of a central device (No. 1).

FIG. 14 is a flowchart showing the operation of a central device which receives request (a) described above. Here, it is assumed that the request from the user terminal includes at least information for identifying a camera and information for identifying a picture monitor used to display pictures taken by the camera.

In step S1, it is checked whether picture data from a requested camera are currently distributed. In this judgment, a distribution state table is referenced. If picture data from the requested camera are being distributed, a distribution instruction is not generated, but in step S2, a receiving instruction is generated and the receiving instruction is transmitted in step S3.

If picture data from the requested camera are not being distributed, in step S11, it is checked whether there is an unused time slot. In this judgment, a distribution state table is referenced. If there is an unused time slot, in step S12, picture data taken by the requested camera are assigned to the unused time slot. Then, in steps S13 and S2, a distribution instruction and a receiving instruction are generated, respectively, and those instructions are transmitted in step S3.

If there is no unused time slot, in step S21, a time slot with low priority is selected from among used time slots. In this selection, the priority tables shown in FIGS. 13A and 13B are referenced. Then, in step S22, the time slot selected in step S21 is divided. Then, in step S23, a picture previously assigned to the selected time slot is assigned to the former half of the selected time slot and a picture taken by the requested camera is assigned to the latter half of the selected time slot. Then, steps S13, S2 and S3 are executed.

A specific example of the operation of the flowchart shown in FIG. 14 is described below. In the following description, as shown in FIG. 10, it is assumed that a distribution device 1 accommodates cameras 101a-101c and a distribution device 2 accommodates a camera 104d. It is also assumed that receiving devices 5a-5d are connected to picture monitors 104a-104d, respectively. It is also assumed that a distribution instruction and a receiving instruction are transmitted from the central device 11 to each distribution device and each receiving device, respectively. Here, examples 1 through 3 will be explained.

EXAMPLE 1

A request to "display the picture of a camera 101a on a picture monitor 104c is issued in a state where pictures taken by cameras 101a and 101b are being displayed on picture monitors 104a and 104b, respectively.

In this case, when the request is received, the distribution state table and receiving state table are in the states shown in FIGS. 15A and 16A, respectively.

On receipt of the request, the central device 11 performs the process of the flowchart shown in FIG. 14. In this example, picture data outputted from the camera 101a are concurrently distributed using a time slot #1. Therefore, the judgment in step S1 is "Yes", and no distribution instruction is generated. However, the central device 11 issues a receiving instruction to "receive the picture data of the time slot #1" to a receiving device 5c to which the picture monitor 104c is connected. At this time, the receiving state table is updated from the state shown in 16A to the state shown in FIG. 16B. Then, the receiving device 5c receives the picture data from the time slot #1 according to the receiving instruction. In this way, the picture of the camera 101a is displayed on the picture monitor 104c.

EXAMPLE 2

A request to "display the picture of a camera 101c on a picture monitor 104c" is issued in a state where pictures taken by cameras 101a and 101b are being displayed on picture monitors 104a and 104b, respectively.

In this case, when the request is received, the distribution state table and receiving state table are also in the states shown in FIGS. 15A and 16A, respectively.

In the case of example 2, picture data outputted from the camera 101c are not concurrently distributed. Therefore, judgment in step S1 is "No", and step S11 is executed. In step S11, the distribution state table is referenced. At this time, the distribution state table is in the state shown in FIG. 15A, and it is detected that a time slot #3 is not used. Then, in step S12, the time slot #3 is assigned to a picture taken by the camera 101c. As a result, the distribution state table is updated from the state shown in FIG. 15A to the state shown in FIG. 15B. The central device 11 issues a distribution instruction to "store picture data outputted from the camera 101c in the time slot #3" to the distribution device 1 which accommodates the camera 101c.

The central device 11 further issues a receiving instruction to "receive the picture data of the time slot #3" to a receiving device 5c to which the picture monitor 104c is connected. At this time, the receiving state table is updated from the state shown in FIG. 16A to the state shown in FIG. 16C. Then, the receiving device 5c receives picture data from the time slot #3 according to the receiving instruction. In this way, the picture of the camera 101c is displayed on the picture monitor 104c.

EXAMPLE 3

A request to "display the picture of a camera 101d on a picture monitor 104d" is issued in a state where pictures taken by cameras 101a through 101c are being displayed on picture monitors 104a through 104c, respectively.

In this case, when the request is received, the distribution state table and receiving state table are in the states shown in FIGS. 15B and 16C, respectively.

In the case of example 3, the judgment in step S1 is "No" as in the case of example 2, and step S11 is executed. In step S11, the distribution state table is referenced. At this time, the distribution state table is in the state shown in FIG. 15B, and all the time slots are already used. Therefore, steps S21 through S23 are executed.

In step S21, a time slot with low priority is selected. If the priority table shown in 13A is referenced, it is found that the priority of a receiving device 5c is the lowest of receiving devices 5a-5c. Therefore, a time slot #3 corresponding to the receiving device 5c is selected. If the priority table shown in FIG. 13B is referenced, it is found that the priority of a camera 101c is the lowest of cameras 101a-101c. Therefore, the time slot #3 corresponding to the camera 101c is selected. The time slot selected when the priority table shown in FIG. 13A is referenced and the time slot selected when the priority table shown in FIG. 13B is referenced do not always match.

Then, in steps S22 and S23, a picture taken by a camera 101c and a picture taken by a camera 101d are assigned to the former half and latter half, respectively, of a time slot #3. As a result, the distribution state table is updated from the state shown in FIG. 15B to the state shown in FIG. 15C. Then, the central device 11 issues a distribution instruction to "store picture data outputted from the camera 101c in the former half of the time slot #3" to the distribution device 1 which accommodates the camera 101c, and a distribution instruction to "store picture data outputted from the camera 101d in the latter half of the time slot #3" to the distribution device 2 which accommodates the camera 101d.

The central device 11 further issues a receiving instruction to "receive picture data in the former half of the time slot #3" to the receiving device 5c to which the picture monitor 104c is connected, and a receiving instruction to "receive picture data in the latter half of the time slot #3" to the receiving device 5d to which the picture monitor 104d is connected. At this time, the receiving state table is updated from the state shown in FIG. 16C to the state shown in FIG. 16D. Then, the receiving device 5c receives the picture data from the former half of the time slot #3 and the receiving device 5*d* receives the picture data from the latter half of the time slot #3. In this way, the pictures of the cameras 101*c* and 101*d* are displayed on the picture monitors 104*c* and 104*d*, respectively.

FIG. 17 is a flowchart showing the operation of a central device which receives request (b) described above. In this example, it is assumed that the request from the user terminal contains information for identifying a picture monitor of which the picture display should be stopped.

In step S31, it is checked whether the same picture as displayed on a requested monitor is displayed on another picture monitor. In this judgment, a receiving state table is referenced. If the same picture is also displayed on another picture monitor, no distribution instruction is generated. However, in step S32, a receiving instruction is generated and the receiving instruction is transmitted in step S33.

If the same picture as displayed on the requested monitor is not displayed on another picture monitor, in step S41, it is checked whether a time slot corresponding to the requested picture monitor is divided to establish two or more channels. In this judgment, a distribution state table is referenced. If the time slot is not divided, in step S42, the time slot is released. After that, this time slot is available to transmit desired picture data. Then, in steps S43 and S32, a distribution instruction and a receiving instruction are generated, respectively, and the instructions are transmitted in step S33.

If the time slot corresponding to the requested picture monitor is divided, the time slot is released once in step S51, and then a picture which will be continuously displayed among the pictures previously assigned to the former and latter half of the time slot is assigned to the whole time slot. Then, steps S13, S2 and S3 are executed.

A specific example of the operation indicated by the flowchart shown in FIG. 17 is described below.

EXAMPLE 1

A request to "stop the display of a picture monitor 104*c*" is issued in a state where a picture taken by a camera 101*a* is being displayed on picture monitors 104*a* and 104*c* and where a picture taken by a camera 101*b* is being displayed on a picture monitor 104*b*.

In this case, when the request is received, a distribution state table and a receiving state table are in the states shown in FIGS. 15A and 16B, respectively.

On receipt of the request, the central device 11 performs a process of the flowchart shown in FIG. 17. In this example, on the picture monitor 104*c*, a picture taken by the camera 101*a* is displayed. Here, the picture taken by the camera 101*a* is displayed also on the picture monitor 104*a*. Therefore, judgment in step S31 is "Yes", and no distribution instruction is generated. Then, the central device 11 issues a receiving instruction to "stop the reception of picture data" to a receiving device 5*c* to which the picture monitor 104*c* is connected. At this time, the receiving state table is updated from the state shown in FIG. 16B to the state shown in FIG. 16A. Then, on receipt of this receiving instruction, the receiving device 5*c* stops the operation of receiving picture data from a transmission line 105. In this way, the picture display of the picture monitor 104*c* is stopped.

EXAMPLE 2

A request to "stop the display of a picture monitor 104*c*" is issued in a state where pictures taken by cameras 101*a*-101*c* are being displayed on picture monitors 104*a*-104*c*, respectively.

In this case, when the request is received, a distribution state table and a receiving state table are in the states shown in FIGS. 15B and 16C, respectively.

In the case of example 2, on the picture monitor 104*c*, a picture taken by the camera 101*c* is being displayed. Here, the picture taken by the camera 101*c* is not displayed on another picture monitor. Therefore, judgment in step S31 is "No", and step S41 is executed. At this time, the picture taken by the camera 101*c* is assigned to a time slot #3, and the time slot #3 is used without being divided. Therefore, in step S42, the time slot #3 is released. As a result, the distribution state table is updated from the state shown in FIG. 15B to the state shown in FIG. 15A. The central device 11 issues a distribution instruction "not to distribute picture data outputted from the camera 101*c*" to a distribution device 1 which accommodates the camera 101*c*.

The central device further issues a receiving instruction to "stop the reception of picture data" to a receiving device 5*c* to which the picture monitor 104*c* is connected. At this time, the receiving state table is updated from the state shown in FIG. 16C to the state shown in FIG. 16A. Then, on receipt of this receiving instruction, the receiving device 5*c* stops the operation of receiving picture data from a transmission line 105. In this way, the picture display of the picture monitor 104*c* is stopped.

EXAMPLE 3

A request to "stop the display of a picture monitor 104*d*" is issued in a state where pictures taken by cameras 101*a*-101*d* are being displayed on picture monitors 104*a*-104*d*, respectively.

In this case, when the request is received, a distribution state table and a receiving state table are in the states shown in FIGS. 15C and 16D, respectively.

In the case of example 3, the judgment in step S31 is "No" and step S41 is executed as in the case of example 2. At this time, a picture taken by the camera 110*d* is assigned to a time slot #3, and the time slot #3 is divided to establish two channels. Specifically, the picture of the camera 101*c* and the picture of the camera 110*d* are assigned to the former half and latter half of the time slot #3, respectively. Therefore, in step S51, the time slot #3 is once released and then the picture of the camera 101*c* is assigned to the whole time slot #3. As a result, the distribution state table is updated from the state shown in FIG. 15C to the state shown in FIG. 15B. Then, the central device 11 issues a distribution instruction to "store picture data outputted from the camera 101*c* in the time slot #3" to the distribution device 1 which accommodates the camera 101*c* and a distribution instruction "not to distribute picture data outputted from the camera 101*d*" to the distribution device 2 which accommodates the camera 101*d*, respectively.

The central device 1 further issues a receiving instruction to "receive the picture data of the time slot #3" to the receiving device 5*c* to which the picture monitor 104*c* is connected and a receiving instruction to "stop the reception of picture data" to the receiving device 5*d* to which the picture monitor 104*d* is connected. At this time, the receiving state table is updated from the state shown in FIG. 16D to the state shown in FIG. 16C. Then, the receiving device 5*c* receives the picture data from the whole time slot #3, and the receiving device 5*d* stops the operation of receiving the picture data. In this way, the picture display of the picture monitor 104*d* is stopped.

The switching from a picture displayed on a specific picture monitor to another picture can be achieved, for example, by combining the processes indicated by the flowcharts shown in FIGS. 14 and 17.

FIG. 18 shows a block diagram of a distribution device. The distribution device multiplexes picture data outputted from a camera on the transmission line 105 according to an instruction from the central device 11.

A line interface unit 21 interfaces a network (transmission line 105). Specifically, the line interface unit 21 receives a frame signal transmitted from the upstream side of the transmission line 105 to output the signal to a demultiplexing unit 22, and also transmits multiplexed data from a multiplexing unit 23 to the downstream side of the transmission line 105 as a frame signal. Here, a frame is, for example, the SDH described above, and picture data are stored in a predetermined area of the frame. The line interface unit 21 is provided with a function to detect a frame synchronous signal and a function to detect a network clock signal.

The demultiplexing unit 22 demultiplexes data stored in a time slot used to transmit picture data from the frame signal transmitted from the upstream side of the transmission line 105 and transmits the demultiplexed data to the multiplexing unit 23. A timing signal generation unit 24 generates a timing signal to be used in this distribution device using the frame synchronization signal and network clock signal detected by the line interface unit 21.

A selector 25 selects picture data transmitted from cameras accommodated in this distribution device. If only one camera is accommodated in the distribution device, there is no need to use the selector 25. An A/D converter 26 converts inputted analog picture data into digital picture data. A PLL unit 27 generates a clock signal synchronous with a network clock signal.

A memory 28 stores picture data outputted from the A/D converter 26. Then, the picture data stored in the memory 28 are read using the clock signal generated by the PLL unit 27.

An encoding unit 29 compresses picture data by encoding the picture data read from the memory 28. The encoding method is not limited to one specific encoding method. The encoding unit 29 can output picture data at an arbitrary data speed according to an instruction from a control unit 31. If, for example, a DCT is used in the encoding process, the data compression rate can be improved by eliminating the higher frequency element of the DCT operation. A buffer memory 30 temporarily stores the picture data in order to output the picture data to the multiplexing unit 23 in an appropriate timing.

The multiplexing unit 23 multiplexes picture data read from the buffer memory 30 with picture data transmitted from the demultiplexing unit 22 according to an instruction from the control unit 31 and outputs the multiplexed data. Specifically, if an "OFF instruction" is issued from the control unit 31, the multiplexing unit 23 outputs picture data from the demultiplexing unit 22. In this case, the distribution device passes the picture data transmitted from the upstream to the downstream side without modification. If an "ON instruction" is issued from the control unit 31, the multiplexing unit 23 outputs the picture data read from the buffer memory 30. In this case, the distribution device multiplexes the picture data transmitted from the upper side with picture data from a camera accommodated in this distribution device. The multiplexing unit 23 attaches multiplexing information to a frame which stores the picture data. As described earlier, this multiplexing information indicates how to place picture data on a transport stream.

The control unit 31 controls the operation of this distribution device according to an instruction (distribution instruction) from the central device 11. Specifically, the control unit 31 designates a video input for the selector 25 to select. The control unit 31 also designates a sampling speed and a number of conversion bits of the A/D converter 26. The control unit 31 also designates the compression rate, etc., of the encoding unit 29. The control unit 31 also generates the ON signal and the OFF signal used to multiplex picture data for the multiplexing unit 23. The control unit 31 also controls a camera accommodated in the distribution device. In this case, for example, an RS-232C interface is used.

In the distribution device with the configuration described above, when receiving a distribution instruction to multiplex a video input 1 in the time slot #1, the control unit 31 gives the following instructions to the selector 25, encoding unit 29 and a multiplexing unit 23.

To selector 25: An instruction to select a video input 1.

To encoding unit 29: Compression rate used to compress picture data into 6 Mbps.

To multiplexing unit 23: ON instruction (a period corresponding to the time slot #1).

If a video input 3 is multiplexed with the former half of the time slot #3, the control unit 31 generates the following instructions.

To selector 25: An instruction to select a video input 3.

To encoding unit 29: Compression rate used to compress picture data into 3 Mbps.

To multiplexing unit 23: ON instruction (a period corresponding to the former half of the time slot #3).

FIG. 19 shows a block diagram of a receiving device. The receiving device extracts designated picture data from among a plurality of multiplexed picture data and displays a picture on a picture monitor according to the instruction from a central device or distribution device.

A line interface unit 41 receives a frame signal from a transmission line 105. The line interface unit 41 is provided with a function to detect a network clock signal. A PLL unit 42 generates an internal clock signal synchronous with the network clock signal. A synchronization detection unit 43 performs synchronization detection, synchronization abnormal detection and synchronization protection based on synchronization data attached to the head of a frame signal received by the line interface unit 41.

A data demultiplexing unit 44 demultiplexes the received frame into a header and a payload, and extracts picture data from the payload. At this time, the data demultiplexing unit 44 extracts picture data only from a time slot assigned to this receiving device according to an instruction from a control unit 50. In this way, a logical channel assigned to this receiving device is terminated. The data demultiplexing unit 44 also extracts multiplexing information attached by the distribution device from the received frame, if such information is required, and supplies the control unit 50 with the information.

A decoding unit 45 decodes encoded picture data. The decoding method is determined by an encoding method used when the picture data is encoded. A memory 46 temporarily stores the picture data decoded by the decoding unit 45. A D/A converter 47 converts the digital picture data decoded by the decoding unit 45 to analog picture data and supplies a picture monitor with the converted picture data. While synchronization is detected by the synchronization detection unit 43, the picture data decoded by the decoding unit 45 is supplied to the picture monitor. However, if abnormal synchronization is detected, past picture data stored in the memory 46 are supplied to the picture monitor according to a freeze instruction issued by the synchronization detection unit 43.

A clock regeneration unit 48 regenerates a clock signal based on the clock information of the distribution device which can be obtained from the data demultiplexing unit 44, and synchronizes the clock signal of the distribution device with the clock signal of this receiving device. A selector 49 selects either a clock signal generated by the PLL unit 42 or a clock signal generated by the clock regeneration unit 48, and outputs the signal as an internal clock signal.

The control unit 50 controls the operation of this receiving device according to an instruction from the central device 11 or a distribution device. Specifically, the control unit 50 designates a position (or timing) in which picture data to be extracted are stored for the data demultiplexing unit 44. The control unit 50 also issues the freeze instruction to the decoding unit 45 and memory 46.

FIGS. 20 through 23 show the operation sequence of the picture distribution system. In this preferred embodiment, it is assumed that distribution devices 1 and 2 accommodate a camera 3 (camera 101*c*) and a camera 4 (camera 101*d*), respectively. A case where the display of a picture monitor K is switched from the picture of the camera 3 to the picture of the camera 4 in a state where the picture of the camera 3 is being displayed, on the picture monitor K connected to a receiving device K is also assumed.

A user issues a request to "switch the display of the picture monitor K from the picture of a camera 3 to the picture of a camera 4" using a user terminal. On receipt of this request, the central device 11 first refers to a receiving state table and checks whether the picture of the camera 3 is displayed on a picture monitor other than the picture monitor K. If the picture of the camera 3 is not displayed on another picture monitor, the central device 11 issues a distribution stop request to the distribution device 1 to stop the distribution of the picture of the camera 3. This distribution stop request contains allocation information. The allocation information includes information for identifying a logical channel (time slot used to store picture data) used to transmit picture data and information about how to place picture data on a transport stream (information indicating a position used to store the picture data).

On receipt of this request, the distribution device 1 issues an output stop request to the camera 3. The camera 3 stops the output of picture data in response to the request and returns an output stop reply to the distribution device 1. On receipt of the reply from the camera 3, the distribution device 1 stops the distribution of picture data designated by the distribution stop request from the central device 11. Specifically, the distribution device 1 stops the transmission of picture data from the camera 3 using a logical channel designated according to the assignment information. Then, the distribution device 1 issues a distribution stop reply to the central device 11.

On receipt of the reply from the distribution device 1, the central device 11 updates a distribution state table. Specifically, a record corresponding to the camera 3 is deleted from the distribution state table.

If the picture of the camera 3 is displayed on a picture monitor other than the picture monitor K when the request from a user terminal is received, it is checked whether there is an unused band for logical channels used to transmit the picture data. If there is an unused band, the flow proceeds to a process shown in FIG. 21. If there is no unused band, the flow proceeds to a process shown in FIG. 22.

Figure 21:
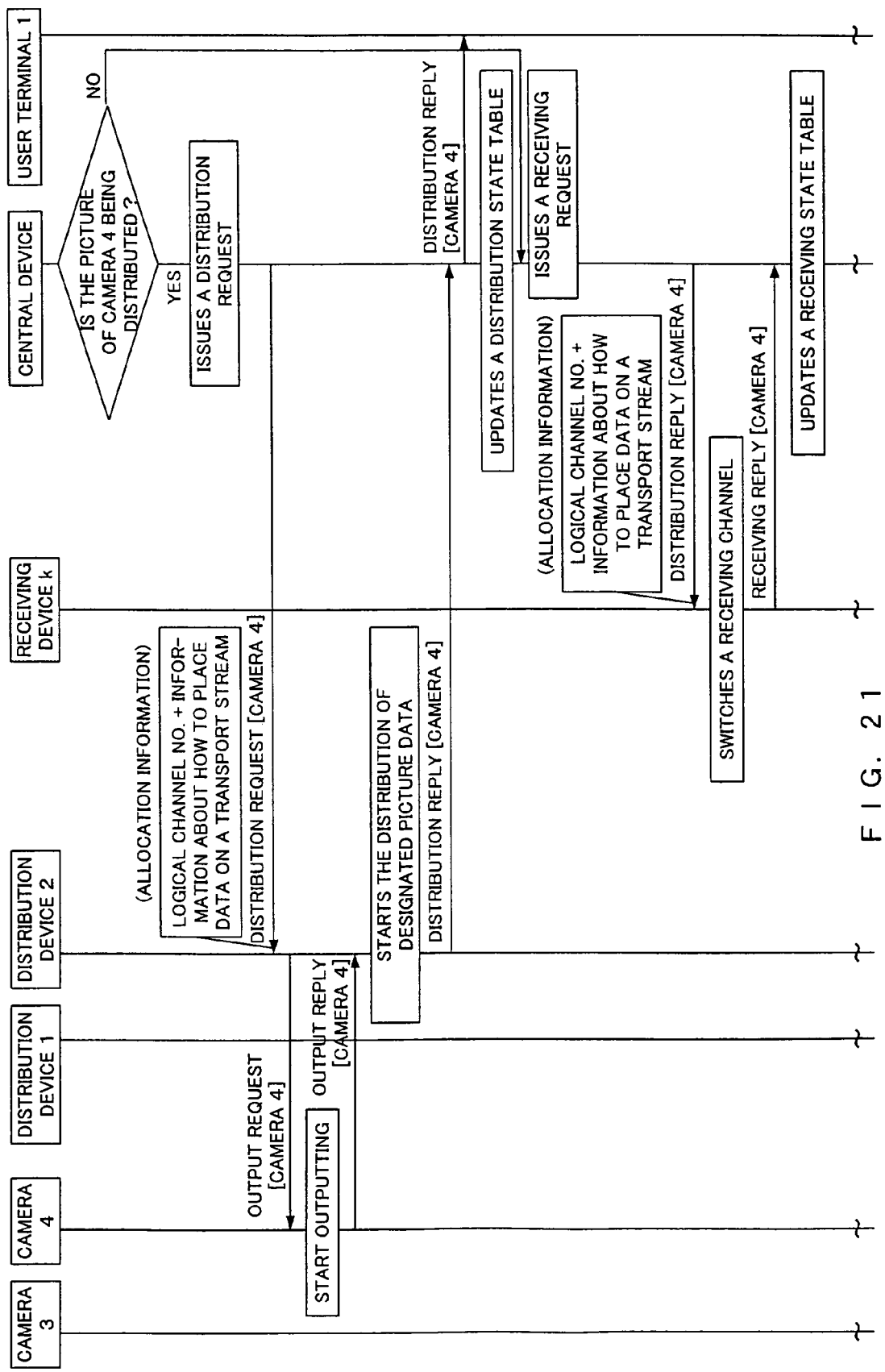

Next, the process shown in FIG. 21 is described. After stopping the distribution of the picture of the camera 3, the central device 11 refers to the distribution state table and checks whether the picture of a camera 4 is currently distributed. If the picture of the camera 4 is not being distributed, the central device 11 issues a distribution request to the distribution device 2 to distribute the picture of the camera 4. This distribution request also contains allocation information.

The distribution device 2 makes a request for the camera 4 to output picture data based on the received distribution request. The camera 4 outputs the picture data and returns an output reply to the distribution device 2. On receipt of this reply, the distribution device 2 starts the distribution of the picture data outputted from the camera 4 and returns a distribution reply to the central device 11. At this time, the distribution device 2 transmits the picture data from the camera 4 via a logical channel (time slot) designated by the distribution request from the central device 11.

On receipt of the distribution reply from the distribution device 2, the central device 11 updates a distribution state table. Specifically, the central device 11 adds a record corresponding to the camera 4. If a picture of the camera 4 is being distributed when a request to display the picture is received from the user terminal, the central device 11 does not issue a distribution request to distribute the picture of the camera 4.

Then, the central device 11 issues a receiving request to the receiving device K to which the picture monitor K used to display the picture of the camera 4 is connected. This receiving request contains allocation information. This allocation information is basically the same as the allocation information contained in the distribution request transmitted to the distribution device 2. On receipt of the receiving request, the receiving device K switches a logical channel (time slot) used to receive the picture data according to the allocation information. In this example, since the allocation information contained in the distribution request, which is transmitted to the distribution device 2, and the allocation information contained in the receiving request, which the receiving device K receives, are basically the same, the receiving device K can receive picture data, which the distribution device 2 distributes according to the distribution request.

Then, the receiving device K returns a receiving reply to the central device 11. On receipt of the reply, the central device 11 updates a receiving state table. Specifically, the central device 11 updates the distribution device number and camera number of a record corresponding to the receiving device K.

In the sequence described above, the display of the receiving monitor K is switched from the picture of the camera 3 to the picture of the camera 4.

Figure 22:
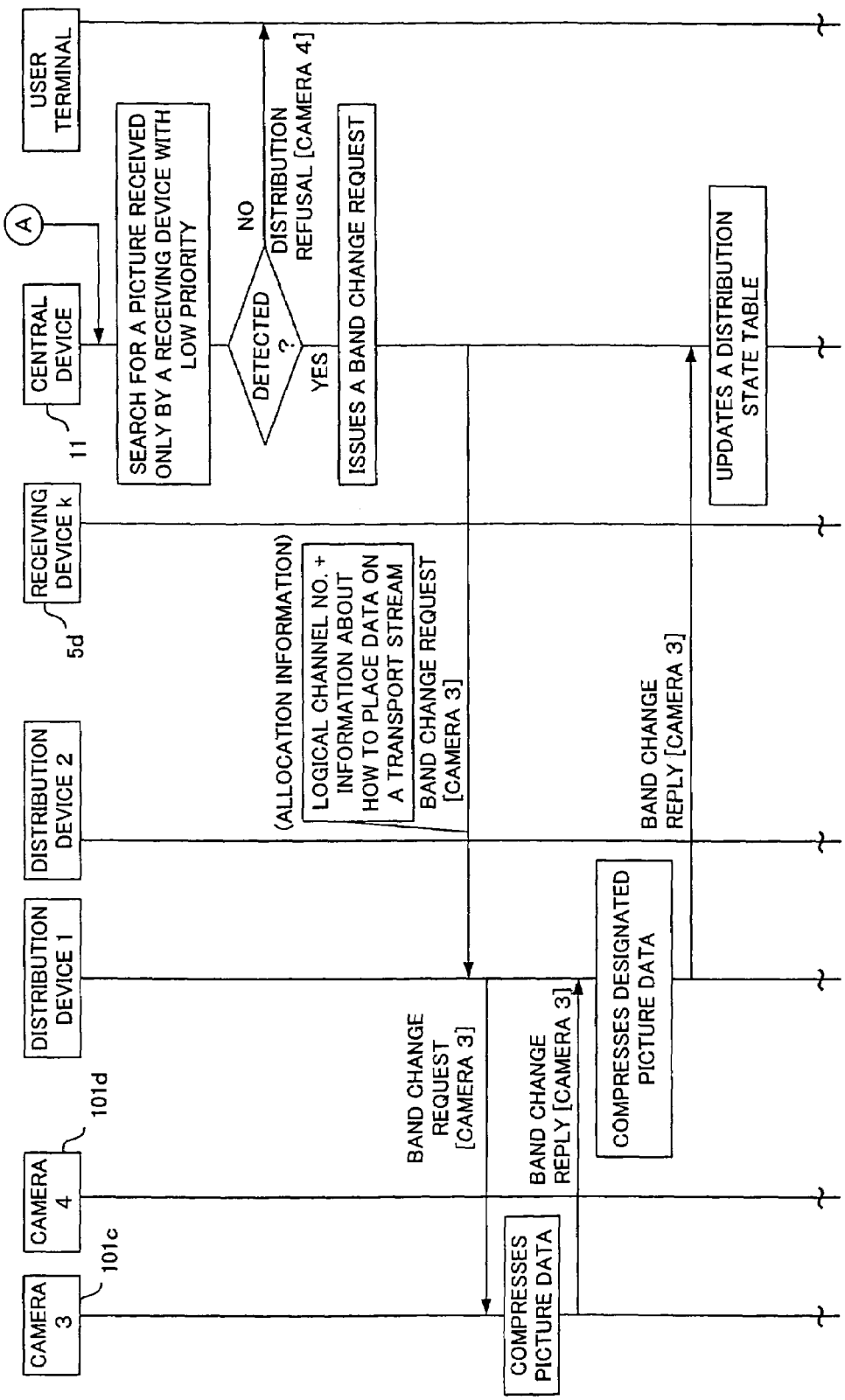

If all bands for transmitting picture data are already in use when the distribution of the picture of the camera 4 is requested from the user terminal, the flow proceeds to the sequence shown in FIG. 22. In this case, the central device 11 first refers to the receiving state table and a priority table, and searches for a picture which is being received only by a receiving device with low priority. This is because a part of a band used to transmit a picture which is displayed on a receiving terminal with low priority is assigned to the picture of the camera 4. If the central device 11 detects such a picture, it issues a band change request to a distribution device which is currently distributing the picture. If the central device 11 cannot detect such a picture, it issues a message to the user terminal indicating that the user's request is not accepted. If a plurality of pictures which are being received only by receiving devices with low priority are detected, an arbitrary picture is selected at random from the pictures.

It is assumed that the central device 11 has issued a band change request to a distribution device 1. This band change request contains allocation information. In this case, the allocation information includes "information indicating that the band of the picture data from the camera 3 is compressed and information about the storage position of the compressed picture data".

On receipt of the band change request, the distribution device 1 compresses the picture data from the camera 3 according to the assignment information, stores the compressed picture data in a designated position and distributes the data. Then, the distribution device 1 returns a band change reply to the central device 11. If the camera 3 is provided with a function to modify the band of picture data, the band change request is transferred to the camera 3, and the camera 3 compresses the picture data according to the request. In this case, the distribution device 1 simply stores picture data received from the camera 3 in the designated position without processing and outputs the data.

On receipt of the band change reply from the distribution device 1, the central device 11 updates a distribution state table. Specifically, the central device 11 updates information about how to store picture data of a record corresponding to the camera 3.

Figure 23:
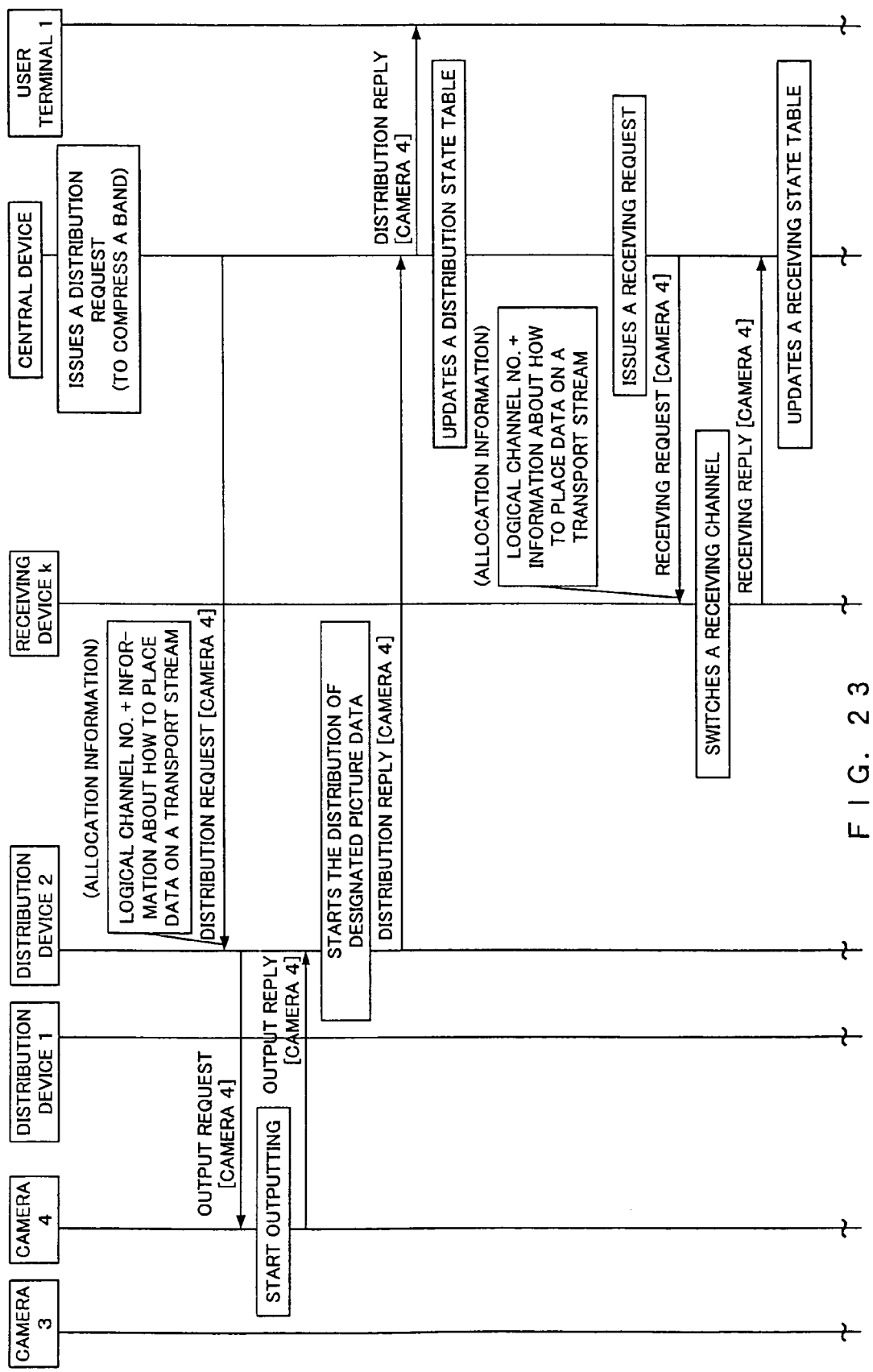

Next, FIG. 23 is described. The sequence shown in FIG. 23 is basically the same as that shown in FIG. 21. However, in the sequence shown in FIG. 23, a distribution request issued from the central device 11 to a distribution device 2 contains an instruction to compress picture data from a camera 4. Therefore, on receipt of this distribution request, the distribution device 2 compress the picture data from the camera 4, stores the compressed picture data in a position designated by the distribution request and distributes the data.

As described above, according to the system of this preferred embodiment, even if all bands for transmitting picture data are being in use when a specific picture (in this preferred embodiment, the picture of a camera 4) is requested to be distributed, since a part of the band which has been allocated to a picture with low priority (in this preferred embodiment, the picture of a camera 3) is reallocated to the picture of the camera 4, the pictures of both cameras 3 and 4 can be distributed concurrently.

FIG. 24 is a sequence chart showing the operation of a distribution device in the case where the distribution device receives a band change request. In this example, it is assumed that a band change request issued from the central device 11 to a distribution device contains an instruction to "store picture data from a camera 3, which have been stored in the entire time slot #3, in the former half, of the time slot #3". In this example, it is assumed that the time slot #3 transmits data at a speed of 6 Mbps.

On receipt of the band change request, a control unit 31 issues an instruction to modify an encoding speed (encoding rate) to an encoding unit 29. This instruction is a modification of transmission speed of the picture data from 6 Mbps to 3 Mbps. The encoding unit 29 modifies the compression rate of picture data according to this instruction, encodes picture data subsequently inputted to picture data of 3 Mbps and outputs the data. Then, the control unit 31 instructs a multiplexing unit 23 how to store the picture data encoded by the encoding unit 29 in a time slot. Specifically, for example, an instruction to store the picture data in the former half of a time slot #3 is issued. The multiplexing unit 23 stores the picture data in a designated position according to this instruction. The multiplexing unit 23 also attaches multiplexing information to the header of a frame in which the picture data are stored. This multiplexing information indicates the storing position of picture data.

FIG. 25 is a sequence chart showing the operation of a receiving device which has received a receiving request. On receipt of a receiving request from the central device 11, the control unit 50 of a receiving device issues a data demultiplex instruction to a data demultiplexing unit 44. This data demultiplex instruction designates a position (or a timing) in which picture data to be extracted are stored. Then, the data demultiplexing unit 44 extracts the designated picture data from the input frame according to this designation.

FIGS. 26 and 27 show examples of how to store picture data in an SDH frame. In this example, an STM-1 frame is used.

An STM-1 frame is generated by adding an SOH to an AU-4 (management unit 4). An AU-4 is generated by adding an AU pointer to a VC-4 (virtual container 4).

A VC-4 is generated by adding POH (path overhead), etc., to three TUG-3 units (tributary unit group 3). A TUG-3 is generated by adding an NPI, etc., to seven TUG-2 units. A TUG-2 is composed of eleven TU-11 units. A TU-11 is generated by adding a pointer to a VC-11 (virtual container 11). A VC-11 is generated by adding a POH to a C-11 (container 11). A C-11 is generally called a minimum container and is stores a PCM-24.

In the example shown in FIG. 26, each minimum container is divided into two pieces. In this case, each minimum container can store two sets of picture data outputted from two different cameras. In the example shown in. FIG. 27, each minimum container stores only one set of picture data, and each TUG-2 is composed of four sets of picture data.

Although in the preferred embodiments described above, a transmission line which connects each distribution device with each receiving device is in a ring shape, the transmission line of the picture distribution system of the present invention is not necessarily limited to a ring shape. However, if a transmission line is in a ring shape, there are a variety of advantages. For example, if a transmission line for transmitting picture data is composed of a double ring and it is configured in such a way that the same picture data are transmitted in two different directions using the double ring, the picture data can be continuously distributed by looping back the signal, even if there is a failure in the transmission line (including a case where two transmission lines are simultaneously disconnected). The advantages obtained by forming a transmission line in a ring shape are described in Japanese Patent Application No. 11-010747. However, a transmission line does not have to be in a physical ring shape. For example, even if a transmission line is a network connected in a mesh, it is acceptable if the line is theoretically organized in a ring shape.

A technology for establishing a plurality of logical channels in a network and adjusting a band to be allocated to each logical channel depending on a communications condition has been known. For example, in an ATM network, the band of a virtual path or virtual channel is often adjusted according to the traffic congestion of an exchange. However, in a system adopting time division multiplexing, a method of adjusting the band of each of the multiplexed channels depending on the number of pictures to be transmitted is not known.

In the monitoring system of the preferred embodiment described above (a system for monitoring a traffic amount of a road, a natural disaster, etc.), volume of picture data outputted from each camera is generally considered to fluctuate little. For this reason, in this type of system, a time division multiplex method has been conventionally used, and it is common that picture data outputted from each camera are transmitted via a logical channel with a fixed band. However, in the existing distribution system, it is difficult, for example, to simultaneously monitor more pictures in a system where the upper limit of the band of a transmission line is fixed or to monitor many pictures using a transmission line with a narrower band.

The present invention aims to solve this problem, and aims to allocate a band prepared to transmit picture data of each picture depending on the number of pictures to be transmitted, despite being a system adopting time division multiplexing.

According to the picture distribution system of the present invention, each receiving device can receive a specific piece of picture data from a plurality of logical channels established in a transmission line and can display the data. Therefore, even if a specific picture is displayed on a plurality of picture monitors, a plurality of logical channels are never occupied by the picture. Accordingly, the efficiency of use of communications resources can be improved. Since a function to automatically adjust a band to be allocated to each picture depending on the number of simultaneously distributed pictures is provided, communication resources can be efficiently used even if the number of pictures to be displayed fluctuates.

What is claimed is:

1. A picture distribution system for distributing picture data from one or more sources to a plurality of receiving devices using a distribution device, the system comprising:
   a network where a plurality of logical channels are established in a time division multiplex method;
   the distribution device distributing picture data from the one or more sources to the plurality of receiving devices via a logical channel designated by a distribution instruction;
   the plurality of receiving devices receiving picture data from respective logical channels designated by receiving instructions; and
   an allocation unit allocating respective bandwidth to each of a plurality of logical channels used to transmit picture data according to a number of sources for picture data to be transmitted via the plurality of logical channels, wherein
   said allocation unit allocates a predetermined first bandwidth to each of the logical channels when the number of sources for picture data to be transmitted via the plurality of logical channels does not exceed a predetermined threshold number, and when the number of sources for picture data to be transmitted via the plurality of logical channels exceeds the threshold number by having a new source added thereto, said allocation unit
   a) selects one of the plurality of logical channels, on which picture data from a corresponding source has been transmitted, to which the first bandwidth has been allocated,
   b) generates new logical channels each having a second bandwidth, which is obtained by dividing the first bandwidth of the selected logical channel by a predetermined integer, and
   c) allocates one of the new logical channels to the corresponding source and the other of the new logical channels to the new source.

2. The picture distribution system according to claim 1, wherein said network is a ring-shaped transmission line.

3. The picture distribution system according to claim 1, further comprising a determination unit determining the number of logical channels to be established in said network.

4. The picture distribution system according to claim 1, further comprising the allocation unit allocating respective bandwidth used to transmit picture data to the plurality of logical channels.

5. The picture distribution system according to claim 1, wherein
   priority is given in advance to the plurality of logical channels, and
   said allocation unit allocates respective bandwidth to the plurality of logical channels based on the priority given to each logical channel.

6. The picture distribution system according to claim 1, wherein
   priority is given in advance to the plurality of receiving devices; and
   said allocation unit allocates respective bandwidth to said plurality of logical channels based on the priority given to each receiving device.

7. The picture distribution system according to claim 1, wherein
   said distribution device generates a receiving instruction according to a received distribution instruction and transmits the receiving instruction to a corresponding receiving device via said network.

8. A distribution device which is used in a picture distribution system for distributing picture data from one or more sources to a plurality of receiving devices via a network where a plurality of logical channels are established by a time division multiplex method, comprising:
   a distribution unit distributing picture data to the plurality of receiving devices via a logical channel designated by a distribution instruction, the picture data being received by the receiving devices with a function to receive picture data from a logical channel designated by a receiving instruction; and
   an allocation unit for allocating respective bandwidth to the plurality of logical channels used to transmit picture data according to a number of sources for picture data to be transmitted via the plurality of logical channels, wherein
   said allocation unit allocates a predetermined first bandwidth to each of the logical channels when the number of sources for picture data to be transmitted via the plurality of logical channels does not exceed a predetermined threshold number, and when the number of sources for picture data to be transmitted via the plurality of logical channels exceeds the threshold number by having a new source added thereto, said allocation unit
   a) selects one of the plurality of logical channels, on which picture data from a corresponding source has been transmitted, to which the first bandwidth has been allocated,
   b) generates new logical channels each having a second bandwidth, which is obtained by dividing the first bandwidth of the selected logical channel by a predetermined integer, and
   c) allocates one of the new logical channels to the corresponding source and the other of the new logical channels to the new source.

9. A receiving device which is used as one of a plurality of receiving devices in a picture distribution system for distributing picture data using a distribution device from one or more sources to a plurality of receiving devices via a network where a plurality of logical channels are established by a time division multiplex method and respective bandwidth is allocated to the plurality of logical channels used to transmit picture data according to a number of sources for picture data to be transmitted via the plurality of logical channels, comprising:
   a receiving unit receiving a set of picture data from a logical channel designated by a receiving instruction, the set of picture data being transmitted from the distribution device with a function to distribute picture data via a logical channel designated by a distribution instruction, wherein respective bandwidth is allocated as a predetermined first bandwidth to each of the logical channels when the number of sources for picture data to be transmitted via the plurality of logical channels does not exceed a predetermined threshold number, and when the number of sources for picture data to be transmitted via the plurality of logical channels exceeds the threshold number by having a new source added thereto, the respective bandwidth is allocated by
  a) selecting one of the plurality of logical channels, on which picture data from a corresponding source has been transmitted, to which the first bandwidth has been allocated,
  b) generating new logical channels each having a second bandwidth, which is obtained by dividing the first bandwidth of the selected logical channel by a predetermined integer, and
  c) allocating one of the new logical channels to the corresponding source and the other of the new logical channels to the new source.

10. A picture distribution system for distributing picture data from one or more sources to a plurality of receiving devices using a distribution device, comprising:
  a network where fixed-length frames each composed of a plurality of time slots are transmitted;
  one or more distribution devices storing first picture data in a first time slot of the fixed-length frame, storing second picture data in a second time slot of the fixed-length frame, and transmitting the fixed-length frame to the network;
  the plurality of receiving devices receiving the respective picture data from the first or second time slots of the fixed-length frame according to a receiving instruction; and
  an allocation unit for allocating respective bandwidth to the plurality of time slots used to transmit picture data according to a number of sources for picture data to be transmitted via the plurality of time slots, wherein
  said allocation unit allocates a predetermined first bandwidth to each of the time slots when the number of sources for picture data to be transmitted via the plurality of time slots does not exceed a predetermined threshold number, and when the number of sources for picture data to be transmitted via the plurality of time slots exceeds the threshold number by having a new source added thereto, said allocation unit
    a) selects one of the plurality of time slots, on which picture data from a corresponding source has been transmitted, to which the first bandwidth has been allocated,
    b) generates new time slots each having a second bandwidth, which is obtained by dividing the first bandwidth of the selected time slot by a predetermined integer, and
    c) allocates one of the new time slots to the corresponding source and the other of the new time slots to the new source.

11. The picture distribution system according to claim 10, wherein if third picture data are requested to be distributed while the first and second picture data are being distributed, said one or more distribution devices store the first picture data in the first time slot of the fixed-length frame, store the second and third picture data in the second time slot of the fixed-length frame, and transmit the fixed length frame to said network.

12. A picture distribution method for distributing picture data from one or more sources to a plurality of receiving devices using a distribution device, comprising:
  establishing a plurality of logical channels by a time division multiplex method;
  allocating respective bandwidth to the plurality of logical channels used to transmit picture data according to a number of sources for picture data to be transmitted via the plurality of logical channels;
  distributing picture data via a logical channel designated by a distribution instruction; and
  receiving by the plurality of receiving devices respective picture data from logical channels designated by corresponding receiving instructions, wherein
  said allocating step allocates a predetermined first bandwidth to each of the logical channels when the number of sources for picture data to be transmitted via the plurality of logical channels does not exceed a predetermined threshold number, and when the number of sources for picture data to be transmitted via the plurality of logical channels exceeds the threshold number by having a new source added thereto, said allocating step includes
    a) selecting one of the plurality of logical channels, on which picture data from a corresponding source has been transmitted, to which the first bandwidth has been allocated,
    b) generating new logical channels each having a second bandwidth, which is obtained by dividing the first bandwidth of the selected logical channel by a predetermined integer, and
    c) allocating one of the new logical channels to the corresponding source and the other of the new logical channels to the new source.

13. The picture distribution method according to claim 12, further comprising:
  determining a number of logical channels to be established according to the number of sources for picture data to be transmitted via the plurality of logical channels; and
  generating the distribution instruction based on the determined number of logical channels and allocated bandwidth.

* * * * *